United States Patent
Nakamura et al.

(10) Patent No.: US 11,772,263 B2
(45) Date of Patent: Oct. 3, 2023

(54) METHOD FOR DRIVING HAND, AND HAND

(71) Applicant: SEIKO EPSON CORPORATION, Tokyo (JP)

(72) Inventors: Yusaku Nakamura, Chino (JP); Noboru Asauchi, Yamagata-Mura (JP); Mitsuhiro Yamamura, Suwa (JP); Michiko Kawaji, Kai (JP)

(73) Assignee: SEIKO EPSON CORPORATION, Tokyo (JP)

( * ) Notice: Subject to any disclaimer, the term of this patent is extended or adjusted under 35 U.S.C. 154(b) by 204 days.

(21) Appl. No.: 17/512,710

(22) Filed: Oct. 28, 2021

(65) Prior Publication Data

US 2022/0134549 A1    May 5, 2022

(30) Foreign Application Priority Data

Oct. 30, 2020  (JP) ................................. 2020-183022

(51) Int. Cl.
*B25J 9/16* (2006.01)
*B25J 9/12* (2006.01)
*B25J 15/02* (2006.01)

(52) U.S. Cl.
CPC .............. *B25J 9/1612* (2013.01); *B25J 9/12* (2013.01); *B25J 15/026* (2013.01)

(58) Field of Classification Search
CPC ................. B25J 13/06; G05B 19/4155; G05B 2219/31392; G05B 2219/50391
See application file for complete search history.

(56) References Cited

U.S. PATENT DOCUMENTS

| | | | |
|---|---|---|---|
| 2005/0275232 A1 | 12/2005 | Horie et al. | |
| 2009/0261609 A1* | 10/2009 | Shibamoto | B25J 15/022 901/19 |
| 2016/0221188 A1* | 8/2016 | Nagai | B25J 9/1612 |
| 2016/0250757 A1* | 9/2016 | Staab | B25J 15/00 294/183 |

(Continued)

FOREIGN PATENT DOCUMENTS

| | | |
|---|---|---|
| CN | 102485439 A | 6/2012 |
| JP | H08090478 A | 4/1996 |

(Continued)

OTHER PUBLICATIONS

Search Report of the First Office Action CN Application No. 202111255743X dated Mar. 31, 2023.

*Primary Examiner* — Kira Nguyen
(74) *Attorney, Agent, or Firm* — Gang Yu

(57) ABSTRACT

A method for driving a hand includes: detecting a relative position of a first finger part and a second finger part as of when the first finger part and the second finger part pinch a target object therebetween, as a reference relative position, by a position detection unit; moving the relative position of the first finger part and the second finger part to a target relative position where the first finger part and the second finger part are spaced further apart from each other than at the reference relative position by an amplitude of vibration or more, by a drive unit, on accepting an instruction to release the target object pinched by the first finger part and the second finger part; and causing at least one of the first finger part and the second finger part to vibrate by the drive unit, when the target relative position is achieved.

6 Claims, 15 Drawing Sheets

(56) References Cited

U.S. PATENT DOCUMENTS

| | | | |
|---|---|---|---|
| 2019/0351562 A1 | 11/2019 | Iwazaki et al. | |
| 2020/0353627 A1* | 11/2020 | Motowaki | B25J 15/0047 |
| 2021/0101292 A1* | 4/2021 | Kuppuswamy | B25J 9/1612 |

FOREIGN PATENT DOCUMENTS

| | | | |
|---|---|---|---|
| JP | 2010162650 A | 7/2010 |
| JP | 2019146425 A | 8/2019 |
| JP | 2019198946 A | 11/2019 |
| JP | 2020157405 A | 10/2020 |

* cited by examiner

METHOD FOR DRIVING HAND, AND HAND

The present application is based on, and claims priority from JP Application Serial Number 2020-183022, filed Oct. 30, 2020, the disclosure of which is hereby incorporated by reference herein in its entirety.

BACKGROUND

1. Technical Field

The present disclosure relates to a method for driving a hand, and a hand.

2. Related Art

A microgripper described in JP-A-08-090478 has U-shaped grasping fingers and a piezoelectric element opening and closing the U-shaped grasping fingers. When a voltage is applied to the piezoelectric element, tip parts of the U-shaped grasping fingers come into contact with each other and close. When the application of a voltage to the piezoelectric element is stopped, the tip parts of the U-shaped grasping fingers move away from each other and open. As driving the piezoelectric element causes the tip parts of the U-shaped grasping fingers to close and open, the tip parts of the U-shaped grasping fingers can grasp and release a grip target object.

When the U-shaped grasping fingers release the grip target object grasped thereby, the grip target object may adhere to the U-shaped grasping fingers and may not be easily detached in some cases. To cope with this, the microgripper of JP-A-08-090478 also has a detachment mechanism that causes the U-shaped grasping fingers to vibrate at a high frequency so as to repeat the closing and the opening alternately and thus forces the grip target object adhering to the U-shaped grasping fingers to be detached.

However, in the microgripper of JP-A-08-090478, since the U-shaped grasping fingers are made to vibrate at a high frequency so as to repeat the closing and the opening alternately, an excessive stress may be applied to the grip target object when the U-shaped grasping fingers vibrate in the closing direction. This may break or damage the grip target object.

SUMMARY

A method for driving a hand according to an aspect of the present disclosure is provided, the hand including a first finger part and a second finger part, a drive unit driving at least one of the first finger part and the second finger part and thus controlling a relative position of the first finger part and the second finger part, and a position detection unit detecting the relative position of the first finger part and the second finger part. The hand pinches a target object between the first finger part and the second finger part. The method includes: detecting the relative position of the first finger part and the second finger part as of when the first finger part and the second finger part pinch the target object therebetween, as a reference relative position, by the position detection unit; moving the relative position of the first finger part and the second finger part to a target relative position where the first finger part and the second finger part are spaced further apart from each other than at the reference relative position by an amplitude of vibration or more, by the drive unit, on accepting an instruction to release the target object pinched by the first finger part and the second finger part; and causing at least one of the first finger part and the second finger part to vibrate by the drive unit, when the target relative position is achieved.

A hand according to another aspect of the present disclosure includes: a first finger part and a second finger part pinching a target object therebetween; a drive unit driving at least one of the first finger part and the second finger part and thus controlling a relative position of the first finger part and the second finger part; a position detection unit detecting the relative position of the first finger part and the second finger part; a storage unit storing the relative position detected by the position detection unit; and a drive control unit controlling driving of the drive unit. The position detection unit detects the relative position of the first finger part and the second finger part as of when the first finger part and the second finger part pinch the target object therebetween, as a reference relative position. The storage unit stores the reference relative position. The drive control unit moves the relative position of the first finger part and the second finger part to a target relative position where the first finger part and the second finger part are spaced further apart from each other than at the reference relative position by an amplitude of vibration or more, by the drive unit, on accepting an instruction to release the target object pinched by the first finger part and the second finger part. The drive control unit causes at least one of the first finger part and the second finger part to vibrate by the drive unit, when the target relative position is achieved.

DESCRIPTION OF EXEMPLARY EMBODIMENTS

The method for driving the hand and the hand according to the present disclosure will now be described in detail, based on preferred embodiments illustrated in the accompanying drawings.

First Embodiment

Figure 1:
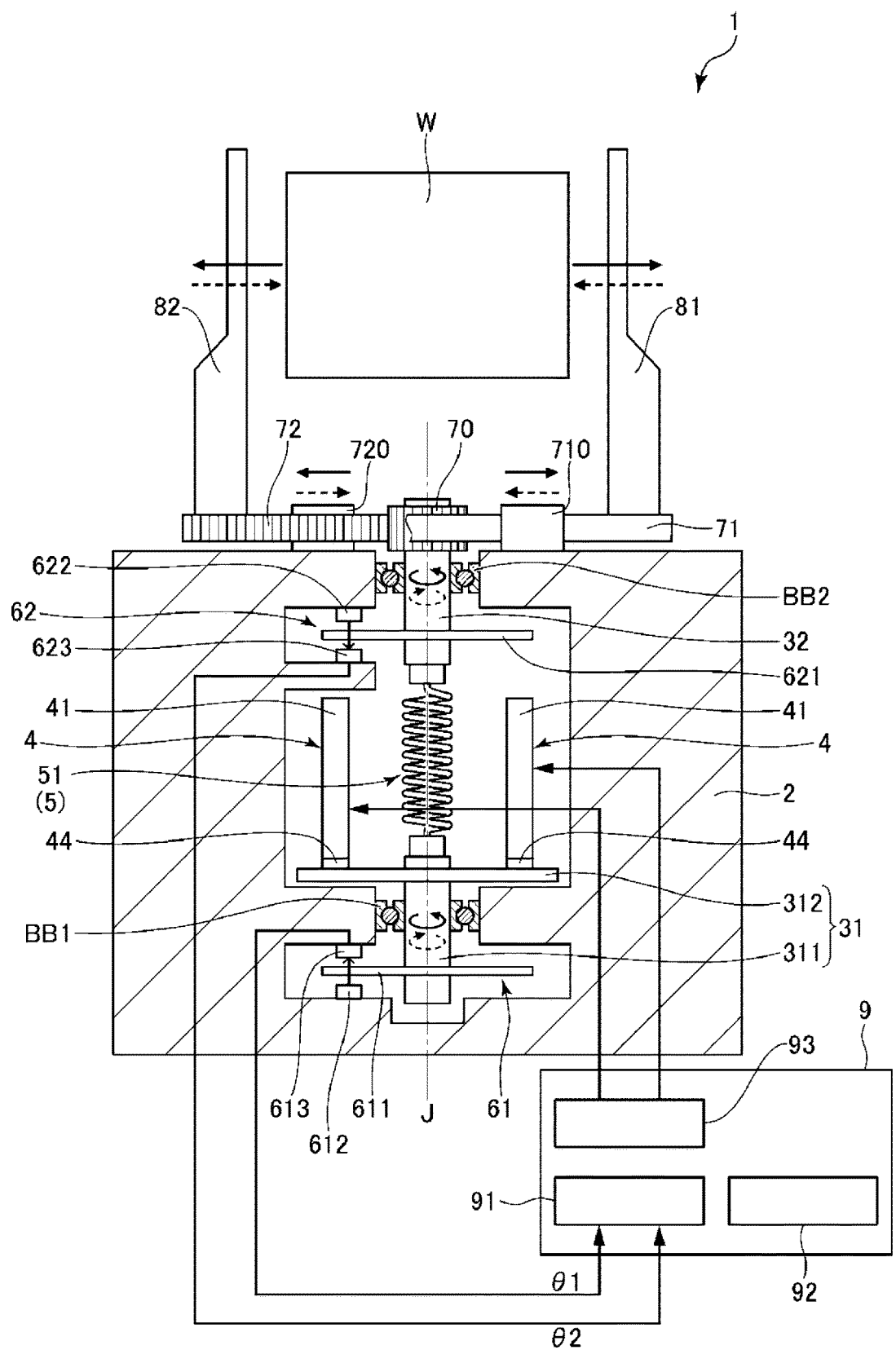
FIG. 1 is a cross-sectional view showing a hand according to a first embodiment of the present disclosure.
Figure 2:
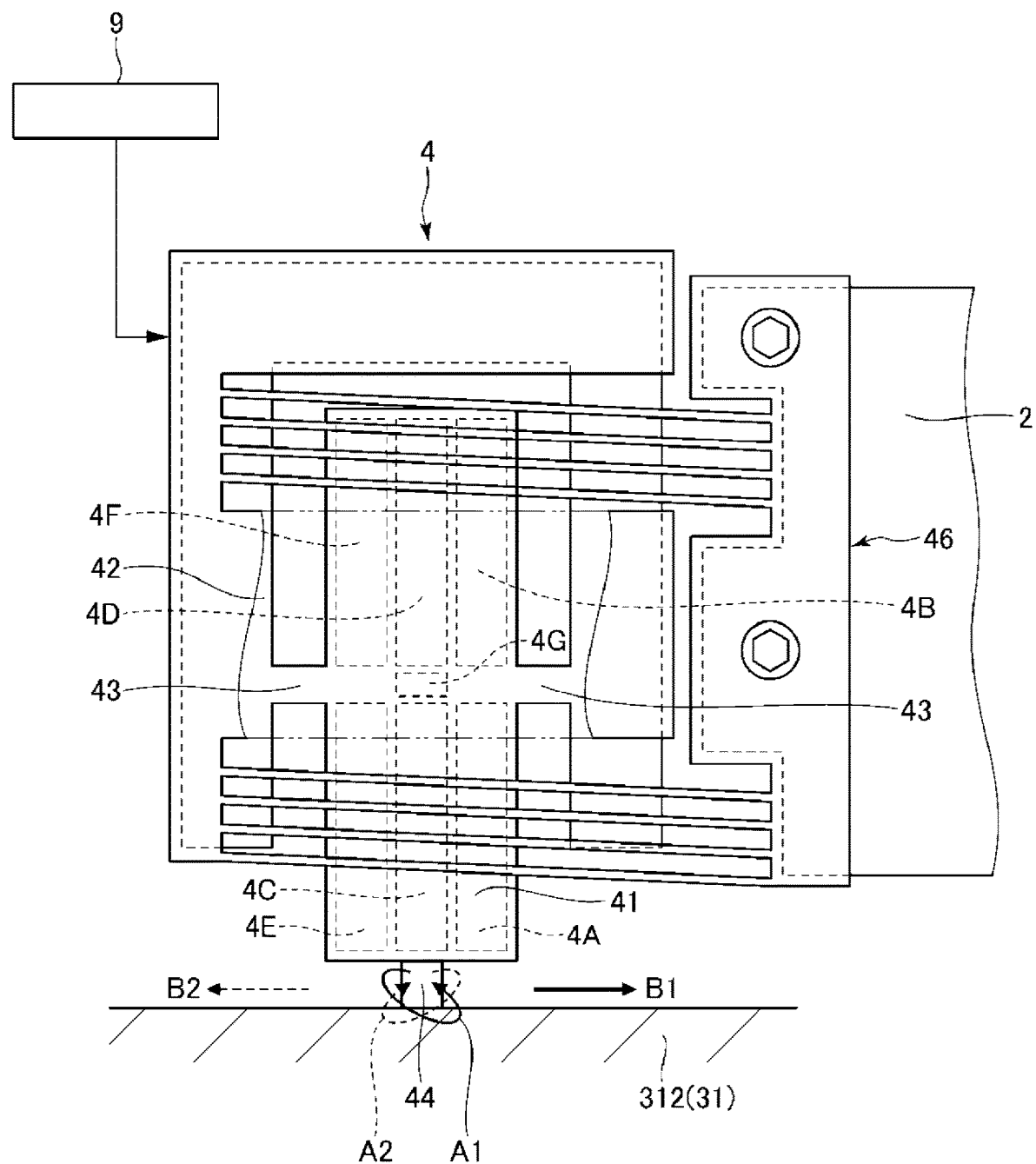
FIG. 2 is a plan view showing an ultrasonic motor provided in the hand shown in FIG. 1.
Figure 3:
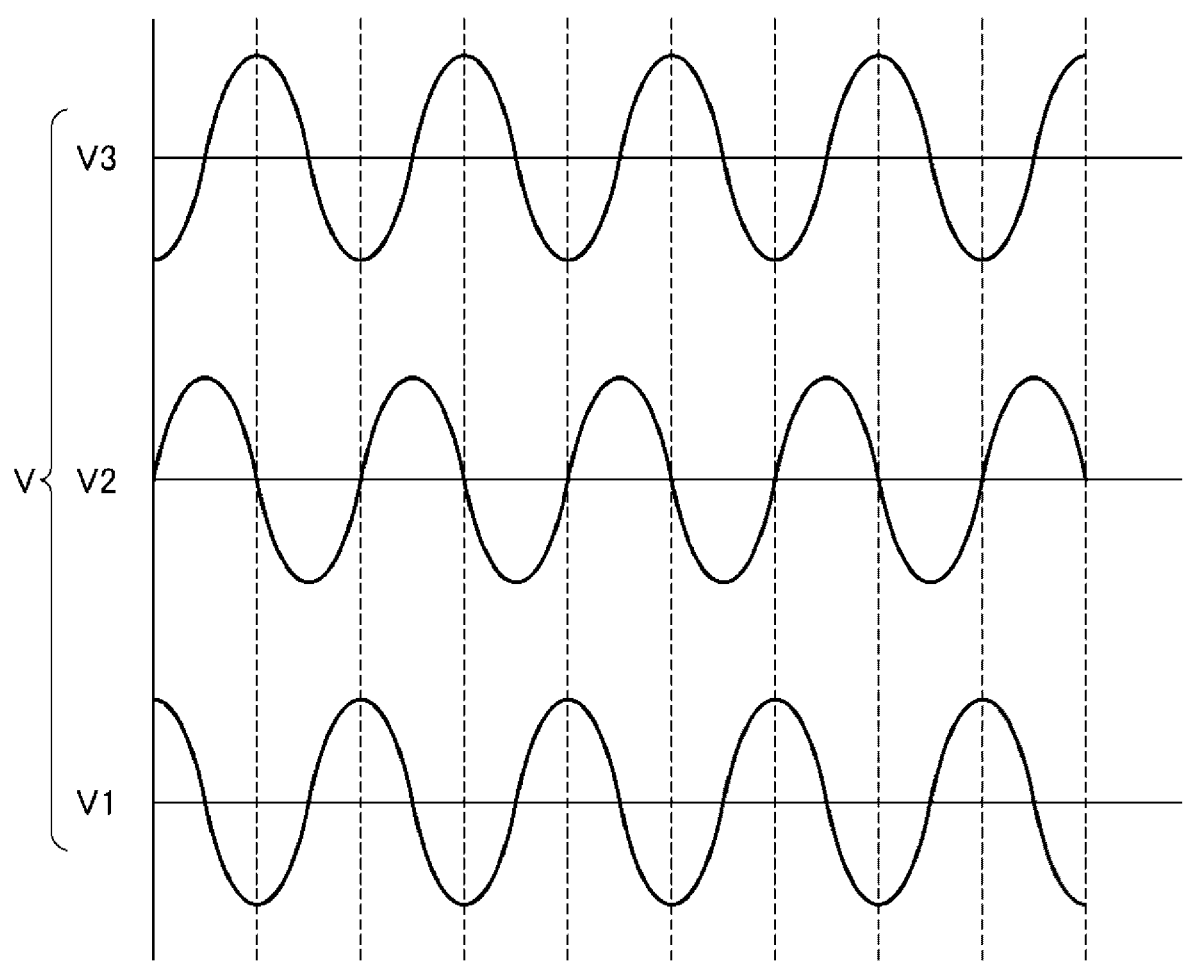
FIG. 3 shows an example of a drive voltage applied to the ultrasonic motor shown in FIG. 2.
Figure 4:
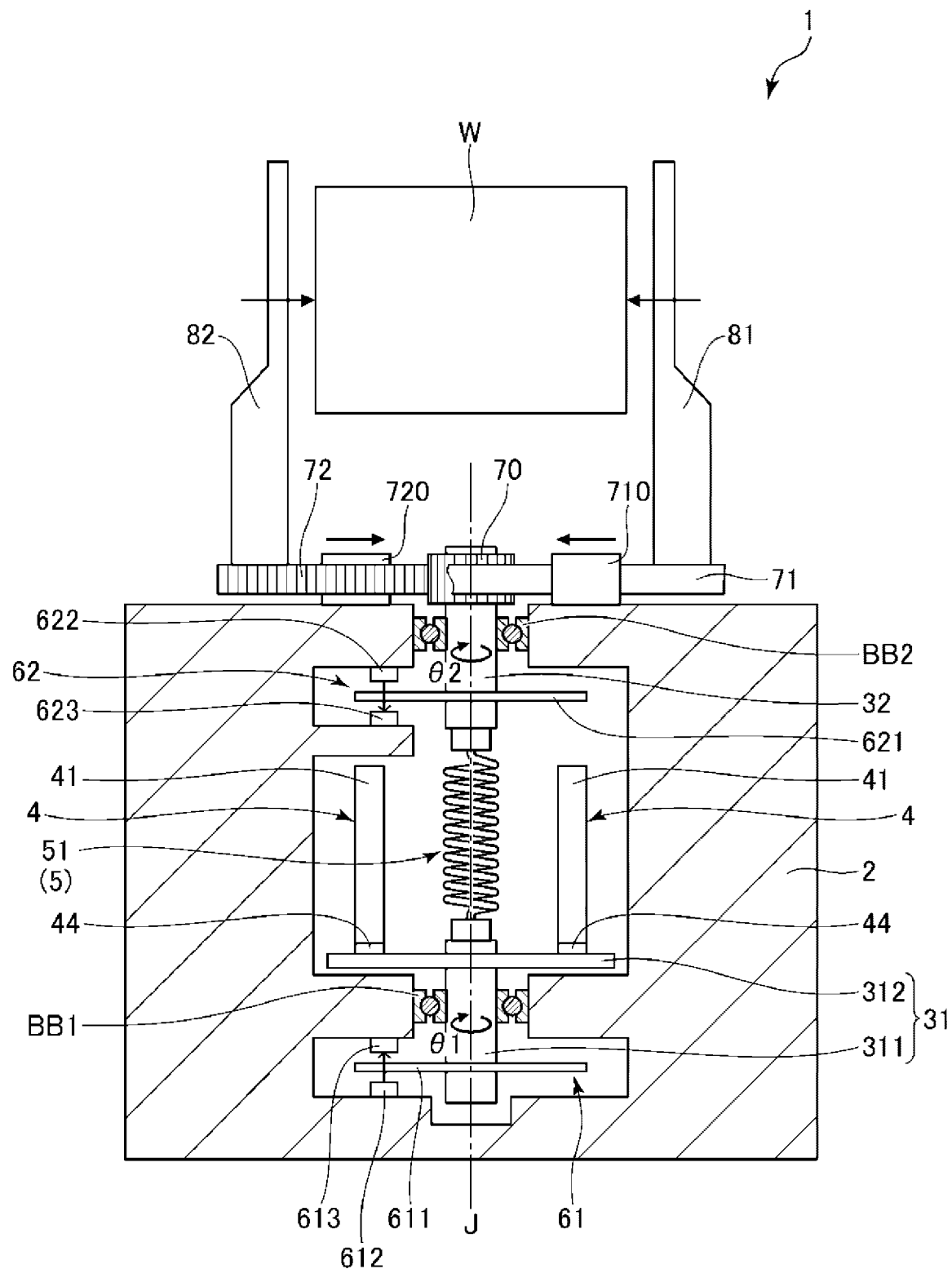
FIG. 4 is a cross-sectional view showing an operation of the hand shown in FIG. 1.
Figure 5:
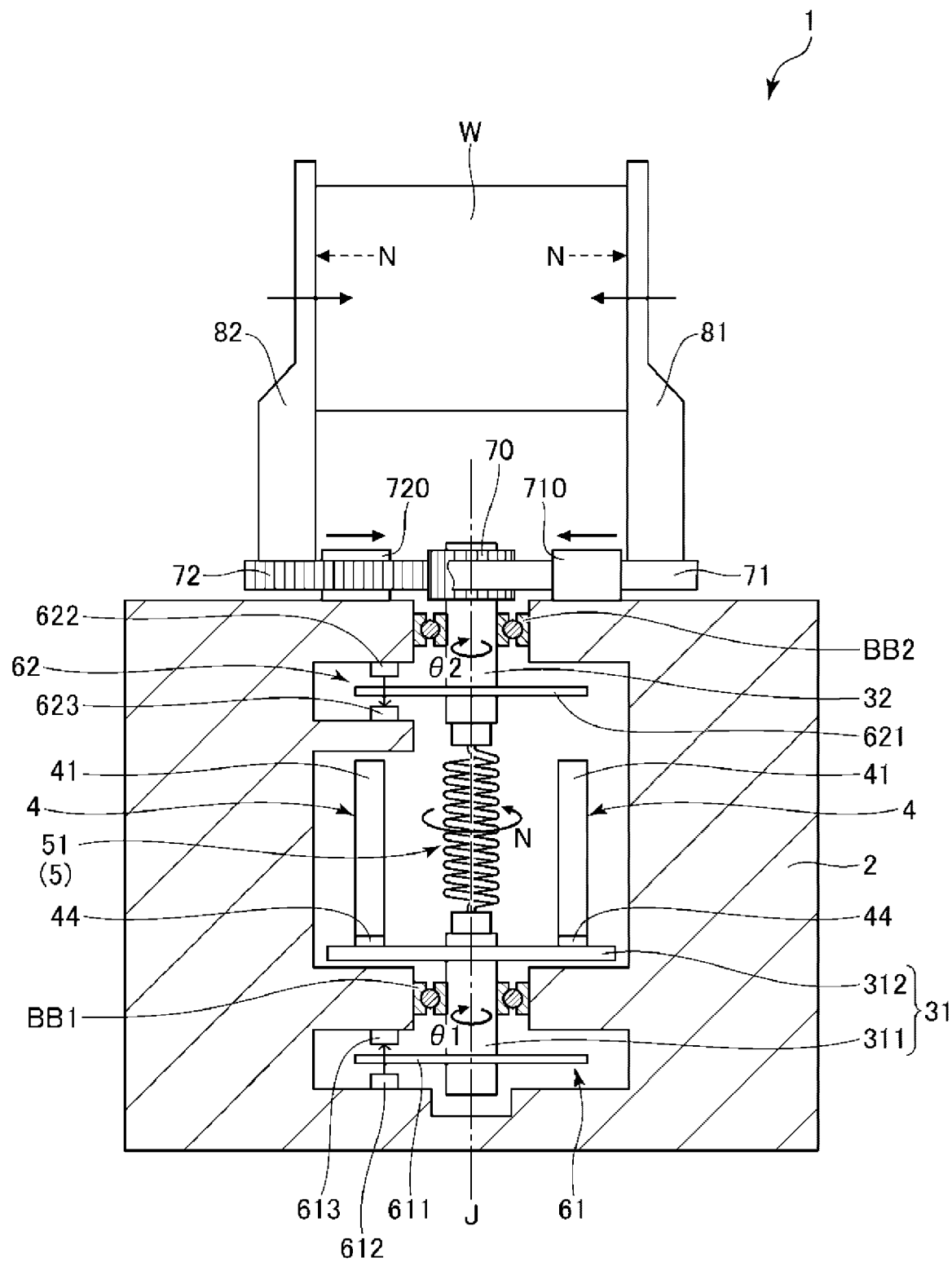
FIG. 5 is a cross-sectional view showing an operation of the hand shown in FIG. 1.
Figure 6:
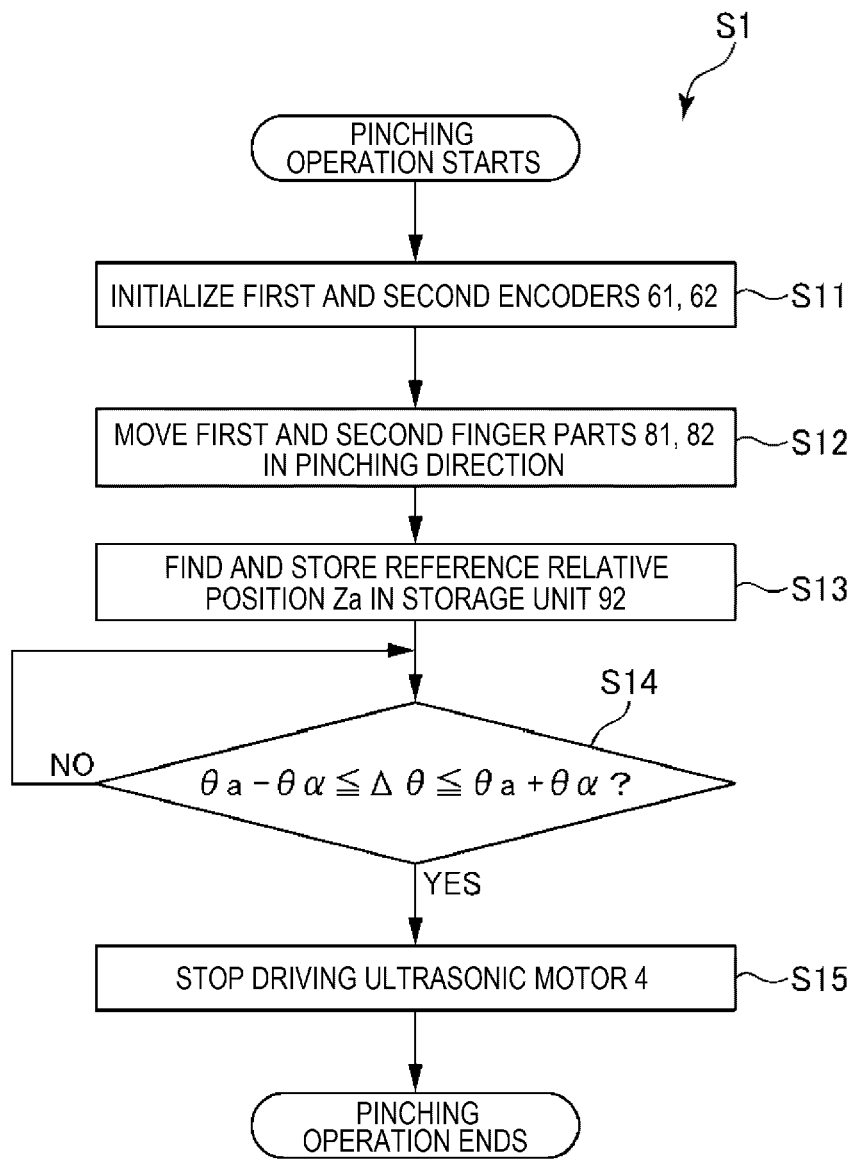
FIG. 6 is a flowchart showing procedures of a pinching operation.
Figure 7:
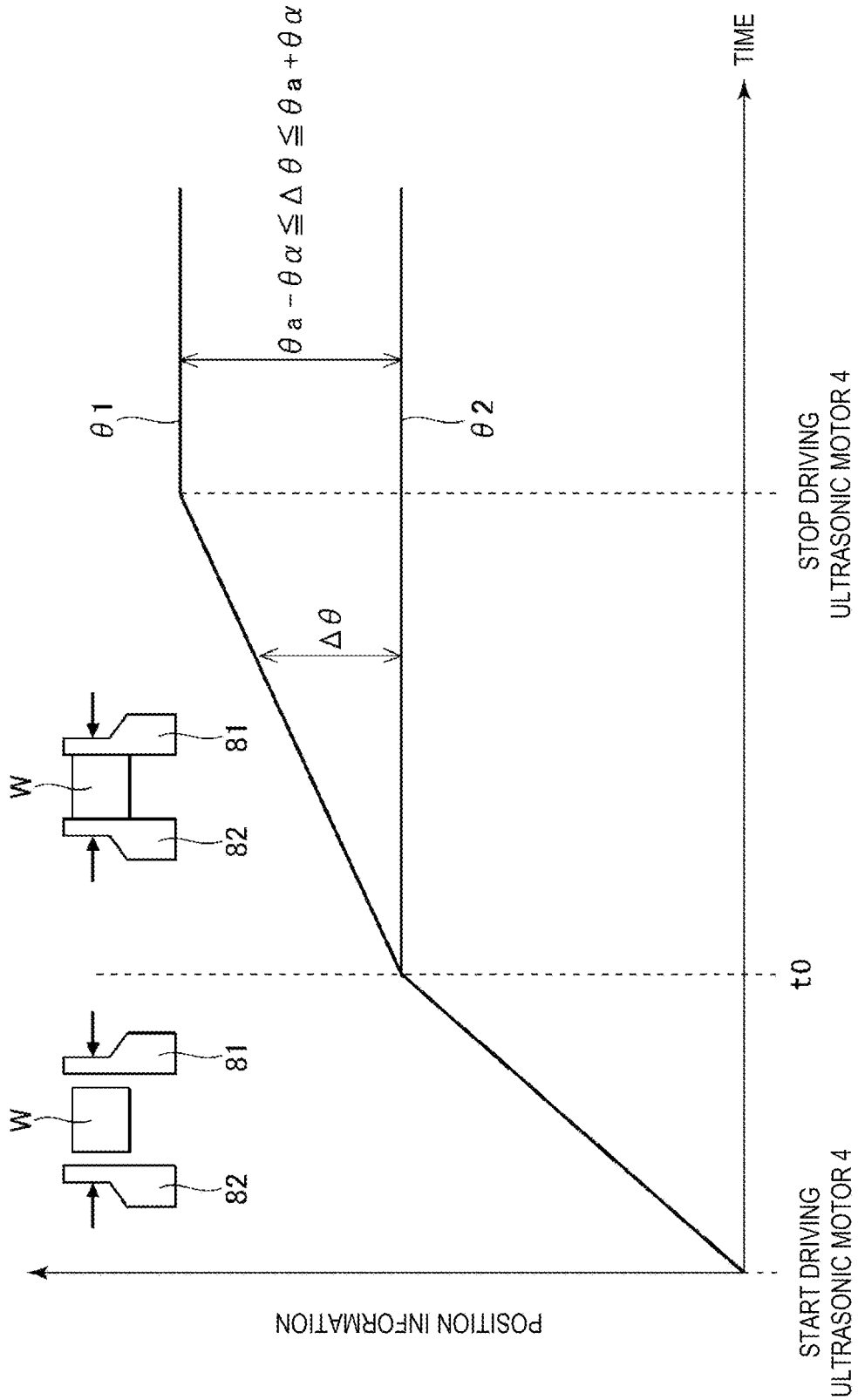
FIG. 7 is a graph showing transition of a difference in amount of rotation Δθ in the pinching operation.
Figure 8:
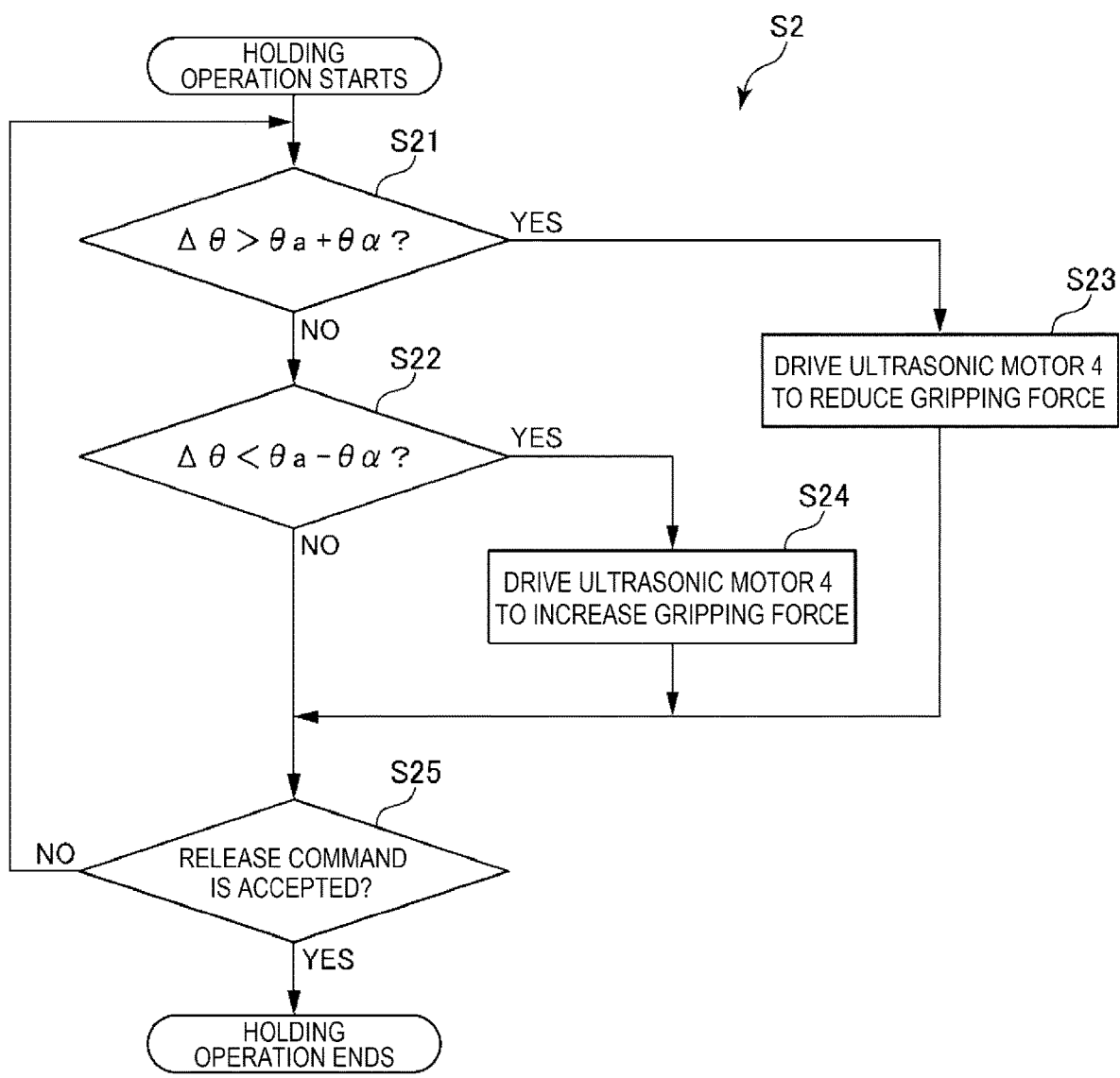
FIG. 8 is a flowchart showing procedures of a holding operation.
Figure 9:
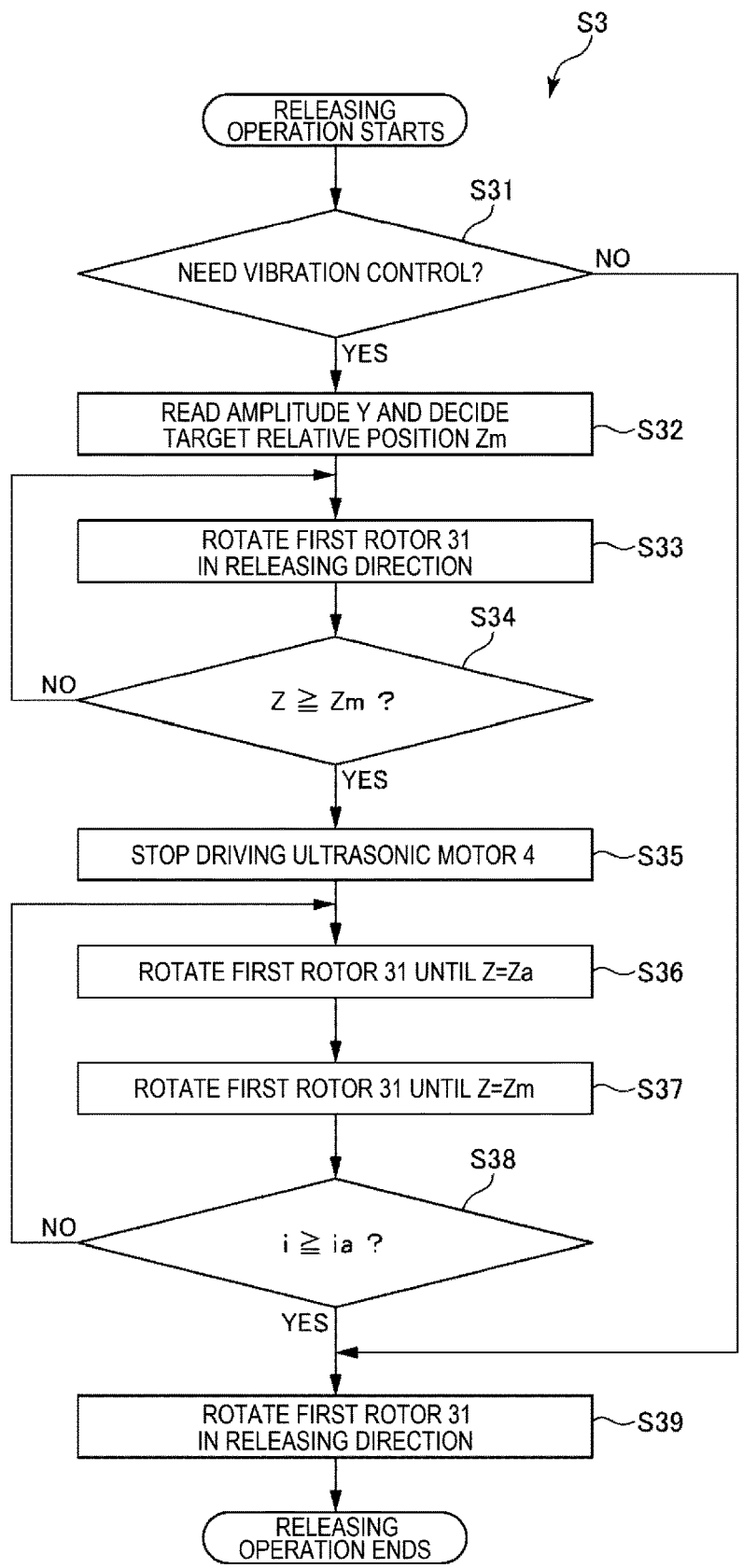
FIG. 9 is a flowchart showing procedures of a releasing operation.

FIG. 1 is a cross-sectional view showing a hand according to a first embodiment of the present disclosure. FIG. 2 is a plan view showing an ultrasonic motor provided in the hand shown in FIG. 1. FIG. 3 shows an example of a drive voltage applied to the ultrasonic motor shown in FIG. 2. FIGS. 4 and 5 are cross-sectional views showing an operation of the hand shown in FIG. 1, respectively. FIG. 6 is a flowchart showing procedures of a pinching operation. FIG. 7 is a graph showing transition of a difference in amount of rotation Δθ in the pinching operation. FIG. 8 is a flowchart showing procedures of a holding operation. FIG. 9 is a flowchart showing procedures of a releasing operation.

The use of a hand 1 shown in FIG. 1 is not particularly limited. For example, the hand 1 may be used as an end effector attached to the distal end of an arm of a multi-joint robot or may be directly gripped by a user for use.

The hand 1 has a base 2, a first rotor 31 supported to be rotatable about a rotation axis J in relation to the base 2, an ultrasonic motor 4 as a drive unit causing the first rotor 31 to rotate about the rotation axis J, a second rotor 32 arranged coaxially with the first rotor 31 and supported to be rotatable about the rotation axis J in relation to the base 2, an elastic transmission unit 5 arranged between the first rotor 31 and the second rotor 32 and coupling the first rotor 31 and the second rotor 32 together, a first encoder 61 detecting an amount of displacement of the first rotor 31, that is, an amount of rotation thereof, a second encoder 62 detecting an amount of displacement of the second rotor 32, that is, an amount of rotation thereof, a pinion 70 fixed to the second rotor 32, a pair of racks 71, 72 supported to be slidable in the direction of an arrow in relation to the base 2, meshing with the pinion 70 and moving in the opposite directions to each other with the rotation of the pinion 70, a first finger part 81 fixed to the rack 71, a second finger part 82 fixed to the rack 72, and a control device 9 controlling the driving of the ultrasonic motor 4.

In such a hand 1, when the control device 9 performs control to drive the ultrasonic motor 4, the first rotor 31 rotates about the rotation axis J. This rotation is transmitted to the second rotor 32 via the transmission unit 5 and the second rotor 32 rotates about the rotation axis J. The pinion 70 rotates with the rotation of the second rotor 32 and the pair of racks 71, 72 move in the opposite directions to each other. In this way, the first finger part 81 and the second finger part 82 move away from and toward each other and thus open and close. By the opening and closing of the first finger part 81 and the second finger part 82, a workpiece W can be pinched and the pinched workpiece W can be released.

The first rotor 31 is pivotally supported to the base 2 via a bearing BB1 and is rotatable about the rotation axis J. The first rotor 31 has a cylindrical base part 311 and a disk-like rotor main body 312 protruding in a circumferential direction from the base part 311. The first encoder 61 is arranged at the first rotor 31 and detects an amount of rotation and an angular velocity of the first rotor 31. The first encoder 61 is not particularly limited and may be, for example, an incremental encoder that detects an amount of rotation of the first rotor 31 when the first rotor 31 rotates, or may be an absolute encoder that detects an absolute position of the first rotor 31 from the origin regardless of whether the first rotor 31 rotates or not.

The first encoder 61 is a rotary encoder and has a disk-like scale 611 fixed to the base part 311 below the rotor main body 312, and a light-emitting element 612 and a light-receiving element 613 arranged opposite each other across the scale 611 and fixed to the base 2. A plurality of slits, not illustrated, that are arranged next to each other in the circumferential direction are formed on the scale 611. The light-receiving element 613 receives light emitted from the light-emitting element 612 and passing through the slits. Therefore, an amount of rotation of the first rotor 31 can be detected, based on the number of times of light reception by the light-receiving element 613, and an angular velocity of the first rotor 31 can be detected, based on the number of times of light reception per unit time. However, the configuration of the first encoder 61 is not particularly limited.

The second rotor 32 is pivotally supported to the base 2 via a bearing BB2 and is rotatable about the rotation axis J. That is, the first rotor 31 and the second rotor 32 are coaxially arranged and are both rotatable about the rotation axis J. The second encoder 62 is arranged at the second rotor 32 and detects an amount of rotation and an angular velocity of the second rotor 32. The second encoder 62 is not particularly limited and may be, for example, an incremental encoder that detects an amount of rotation of the second rotor 32 when the second rotor 32 rotates, or may be an absolute encoder that detects an absolute position of the second rotor 32 from the origin regardless of whether the second rotor 32 rotates or not.

The second encoder 62 has a configuration similar to that of the first encoder 61. That is, the second encoder 62 is a rotary encoder and has a disk-like scale 621 fixed to the second rotor 32, and a light-emitting element 622 and a light-receiving element 623 arranged opposite each other across the scale 621 and fixed to the base 2. A plurality of slits, not illustrated, that are arranged next to each other in the circumferential direction are formed on the scale 621. The light-receiving element 623 receives light emitted from the light-emitting element 622 and passing through the slits. Therefore, an amount of rotation of the second rotor 32 can be detected, based on the number of times of light reception by the light-receiving element 623, and an angular velocity of the second rotor 32 can be detected, based on the number of times of light reception per unit time. However, the configuration of the second encoder 62 is not particularly limited.

Between the first rotor 31 and the second rotor 32 as described above, the transmission unit 5 coupling the first rotor 31 and the second rotor 32 together and transmitting the rotation of the first rotor 31 to the second rotor 32 is arranged. The transmission unit 5 is elastic and is torsionally deformable about the rotation axis J. The transmission unit 5 is not particularly limited, provided that the transmission unit 5 has the above functions. In this embodiment, the transmission unit 5 is formed of a spring, particularly, a coil spring 51 arranged coaxially with the rotation axis J. However, the configuration of the transmission unit 5 is not particularly limited, provided that the transmission unit 5 is elastically deformable, particularly, torsionally deformable about the rotation axis J. For example, the transmission unit 5 may be a leaf spring, a resin sheet member, a plate member, a block member or the like.

Between the first rotor 31 and the second rotor 32, the ultrasonic motor 4 transmitting a drive force to the first rotor 31 and causing the first rotor 31 to rotate about the rotation axis J is arranged. A plurality of ultrasonic motors 4 are arranged at equal intervals around the rotation axis J. Particularly in this embodiment, two ultrasonic motors 4 are arranged at an interval of 180° around the rotation axis J. However, the number and arrangement of ultrasonic motors 4 are not particularly limited.

The two ultrasonic motors 4 are piezoelectric motors and have a vibrating part 41, a protruding part 44 arranged at a distal end of the vibrating part 41, a support part 42 supporting the vibrating part 41, and a beam part 43 coupling the vibrating part 41 and the support part 42 together, as shown in FIG. 2. The support part 42 is fixed to the base 2 via an energizing member 46. The support part 42 in the fixed state is energized toward the rotor main body 312 by the energizing member 46, and the protruding part 44 is pressed against an upper surface of the rotor main body 312.

In the vibrating part 41, six piezoelectric elements 4A, 4B, 4C, 4D, 4E, 4F for driving that cause flexural vibration of the vibrating part 41 are provided. These six piezoelectric elements 4A, 4B, 4C, 4D, 4E, 4F are configured to expand and contract in the longitudinal direction of the vibrating part 41. As each of the piezoelectric elements 4A to 4F expands and contracts at a predetermined timing under the control of the control device 9, flexural vibration of the vibrating part 41 occurs. This flexural vibration is transmitted to the rotor main body 312 via the protruding part 44. Thus, the first rotor 31 rotates about the rotation axis J in relation to the base 2. Also, in the vibrating part 41, a piezoelectric element 4G for detection that outputs a detection signal corresponding to the flexural vibration of the vibrating part 41 is provided.

For example, when a drive signal V1 shown in FIG. 3 is applied to the piezoelectric elements 4A, 4F, a drive signal V2 is applied to the piezoelectric elements 4C, 4D, and a drive signal V3 is applied to the piezoelectric elements 4B, 4E, stretching vibration in the longitudinal direction and flexural vibration in the direction of width occur in the vibrating part 41. As these vibrations are combined together, the distal end of the protruding part 44 makes an elliptical motion having a counterclockwise elliptical trajectory as indicated by an arrow A1 in FIG. 2. Thus, the rotor main body 312 is driven to rotate in a direction indicated by an arrow B1. When the waveforms of the drive signals V1, V3 are switched, stretching vibration in the longitudinal direction and flexural vibration in the direction of width occur in the vibrating part 41. As these vibrations are combined together, the distal end of the protruding part 44 makes a clockwise elliptical motion as indicated by an arrow A2 in FIG. 2. Thus, the rotor main body 312 is driven to rotate in a direction indicated by an arrow B2. In the description below, for the sake of convenience of the description, the drive signals V1, V2, V3 are collectively referred to as a drive signal V.

The ultrasonic motor 4 configured as described above can be miniaturized, compared with other motors such as an electromagnetic motor. This enables miniaturization of the hand 1. The ultrasonic motor 4 also has characteristics such as lower speed and higher torque than an electromagnetic motor. Such characteristics are suitable for driving the hand 1. Therefore, the driving of the hand 1 can be more stable. However, the configuration of the ultrasonic motor 4 and the drive signal to be applied are not particularly limited, provided that the ultrasonic motor 4 can cause the rotor main body 312 to rotate.

Referring back to FIG. 1, the pinion 70 is fixed to an upper end part of the second rotor 32. The pinion 70, together with the second rotor 32, rotates about the rotation axis J. The pair of racks 71, 72 are meshed with the pinion 70. The racks 71, 72 are supported to the base 2 via guide pins 710, 720, respectively, and are movable in a direction orthogonal to the rotation axis J in relation to the base 2. The racks 71, 72 are arranged opposite each other across the pinion 70. When the pinion 70 rotates, the racks 71, 72 move in the opposite directions to each other. The first finger part 81 is fixed to the rack 71. The second finger part 82 is fixed to the rack 72. Therefore, causing the pinion 70 to rotate and thus causing the racks 71, 72 to slide enables the first finger part 81 and the second finger part 82 to move away from and toward each other and thus open and close.

The configuration of the hand 1 has been described. In such a hand 1, when the first rotor 31 rotates in a pinching direction, which is a direction of causing the first finger part 81 and the second finger part 82 to move toward each other, in the state where the first finger part 81 and the second finger part 82 are not in contact with the workpiece W and therefore a reaction force N from the workpiece W is not applied to the first finger part 81 and the second finger part 82, as shown in FIG. 4, the coil spring 51 is not substantially elastically deformed. Therefore, the second rotor 32 rotates by substantially the same amount as the first rotor 31. Thus, an amount of rotation θ1 of the first rotor 31 and an amount of rotation θ2 of the second rotor 32 are equal.

Meanwhile, when the first rotor 31 rotates in the pinching direction, which is the direction of causing the first finger part 81 and the second finger part 82 to move toward each other, in the state where the first finger part 81 and the second finger part 82 are in contact with the workpiece W and therefore the reaction force N from the workpiece W is applied to the first finger part 81 and the second finger part 82, as shown in FIG. 5, the coil spring 51 is elastically deformed in a twisting direction by the reaction force N and therefore a difference in the amount of rotation about the rotation axis J occurs between the upper end and the lower end of the coil spring 51. Therefore, the amount of rotation θ2 of the second rotor 32 is smaller than the amount of rotation θ1 of the first rotor 31. That is, a difference in amount of rotation Δθ=θ1−θ2 is generated between the amount of rotation θ1 of the first rotor 31 and the amount of rotation θ2 of the second rotor 32. This difference in amount of rotation Δθ is proportional to the gripping force on the workpiece W.

The control device 9 has a position detection unit 91 detecting a relative position Z of the first finger part 81 and the second finger part 82, based on the amounts of rotation θ1, θ2, a storage unit 92 storing the relative position Z detected by the position detection unit 91, and a drive control unit 93 controlling the driving of the ultrasonic motor 4, based on the amounts of rotation θ1, θ2 and the difference in amount of rotation Δθ. Such a control device 9 has, for example, a processor (CPU) formed of a computer and configured to process information, a memory communicatively coupled to the processor, and an external interface for coupling to an external device. Various programs executable by the processor are saved in the memory. The processor can read and execute the various programs or the like stored in memory.

The configuration of the hand 1 has been described. A method for driving the hand 1 will now be described in detail, referring to FIGS. 6 to 9. The method for driving the hand 1 includes a pinching operation S1 for pinching the workpiece W, a holding operation S2 for maintaining the state of pinching the workpiece W, and a releasing operation S3 for releasing the pinched workpiece W.

First, the pinching operation S1 will be described. As shown in FIG. 6, first, in step S11, the control device 9 initializes position information of the first encoder 61 and the second encoder 62. Next, in step S12, the control device 9 drives the ultrasonic motor 4 in the state where the workpiece W is located between the first finger part 81 and the second finger part 82, and thus causes the first finger part 81 and the second finger part 82 to move in the pinching direction and pinch the workpiece W therebetween. As shown in FIG. 7, in the state where the first finger part 81 and the second finger part 82 are not in contact with the workpiece W, the coil spring 51 is not elastically deformed. The amounts of rotation $\theta 1, \theta 2$ of the first and second rotors 31, 32 are substantially equal, resulting in the difference in amount of rotation $\Delta\theta=0$.

As the driving of the ultrasonic motor 4 continues, the first finger part 81 and the second finger part 82 move further toward each other and come into contact with the workpiece W. The reaction force N is generated from the workpiece W. The reaction force N causes the coil spring 51 to be torsionally deformed about the rotation axis J. Therefore, the amount of rotation $\theta 2$ of the second rotor 32 becomes smaller than the amount of rotation $\theta 1$ of the first rotor 31 by the amount of the torsional deformation of the coil spring 51, resulting in the difference in amount of rotation $\Delta\theta>0$. As the driving of the ultrasonic motor 4 continues further, the gripping force on the workpiece W gradually increases and the difference in amount of rotation $\Delta\theta$ gradually increases accordingly.

Next, in step S13, the control device 9 stores the relative position Z of the first and second finger parts 81, 82 as of when the first and second finger parts 81, 82 come into contact with the workpiece W and the reaction force N from the workpiece W is applied to the first and second finger parts 81, 82, as a reference relative position Za. That the reaction force N is applied means that a difference between the amounts of rotation $\theta 1, \theta 2$ is generated. In other words, the control device 9 stores the relative position Z of the first and second finger parts 81, 82 as of when a difference between the amounts of rotation 61, 62 is generated, resulting in $\Delta\theta>0$, as the reference relative position Za. Thus, the reference relative position Za can be set more properly.

For example, as shown in FIG. 7, in the process of moving the first and second finger parts 81, 82 in the pinching direction to pinch the workpiece W, the position detection unit 91 detects the amounts of rotation $\theta 1, \theta 2$ periodically and repeatedly, and a time t0 when a difference between the amounts of rotation $\theta 1, \theta 2$ is generated and the difference in amount of rotation $\Delta\theta$ starts to increase from 0, can be defined as "when the reaction force N from the workpiece W is applied to the first and second finger parts 81, 82", and the amount of rotation $\theta 2$ at the time t0 can be defined as the reference relative position Za. The reference relative position Za thus found by the position detection unit 91 is stored in the storage unit 92.

In the control device 9, the difference in amount of rotation $\Delta\theta$ generated when a target gripping force suitable for gripping the workpiece W is applied is stored as a reference difference in amount of rotation. The reference difference in amount of rotation in this embodiment is set to a value of a predetermined amount of rotation $\theta a$ with a margin of $\pm\theta\alpha$, that is, $\theta a-\theta\alpha$ or more and $\theta a+\theta\alpha$ or less. Therefore, the control device 9 continues driving the ultrasonic motor 4 in such a way that $\theta a-\theta\alpha\leq\Delta\theta\leq\theta a+\theta\alpha$. In step S14, the control device 9 compares the difference in amount of rotation $\Delta\theta$ with the reference difference in amount of rotation and determines whether $\theta a-\theta\alpha\leq\Delta\theta a+\theta\alpha$ or not. When not $\theta a-\theta\alpha\leq\Delta\theta\leq\theta a+\theta\alpha$, the control device 9 continues driving the ultrasonic motor 4 until $\theta a-\theta\alpha\leq\Delta\theta\leq\theta a+\theta\alpha$. Meanwhile, when $\theta a-\theta\alpha\leq\Delta\theta\leq\theta a+\theta\alpha$, the control device 9 in step S15 stops driving the ultrasonic motor 4 and maintains the gripping force at the time. Thus, the workpiece W can be gripped with the target gripping force.

As described above, when the ultrasonic motor 4 is stopped, the protruding part 44 is pressed against the rotor main body 312 and a high frictional force is generated between these parts. Therefore, even when the driving of the ultrasonic motor 4 is stopped, the first rotor 31 does not rotate and the gripping force on the workpiece W can be maintained.

The pinching operation has been described. By such a method, the workpiece W can be gripped properly with a preset gripping force. Therefore, breakage of the workpiece W due to a gripping force that is too strong or unintentional detachment of the workpiece W due to a gripping force that is too weak can be effectively restrained. When the workpiece W is gripped with a sufficient gripping force, the ultrasonic motor 4 is stopped. Therefore, the ultrasonic motor 4 is not driven any further and not driven excessively.

The holding operation S2 will now be described. After the pinching operation S1 ends, the hand 1 is driven to perform the holding operation S2 until the hand 1 reaches a position and an attitude (hereinafter referred to as "target position") where the releasing operation S3 is to be performed. When the hand 1 moves to the target position, various external forces such as acceleration, angular velocity, and vibration are applied to the hand 1. Due to the influence of these external forces, the gripping force on the workpiece W may change. Therefore, the control device 9 controls the driving of the hand 1 in such a way that the gripping force is kept to be the target gripping force until the hand 1 reaches the target position after finishing the pinching operation S1. Thus, unintentional detachment of the workpiece W or unintentional shift in position of the workpiece W while the hand 1 is moving to the target position after finishing the pinching operation S1, can be effectively restrained. The workpiece W can be carried to the target position more securely and stably.

As shown in FIG. 8, in such a holding operation S2, first, the control device 9 in step S21 determines whether the difference in amount of rotation $\Delta\theta$ is $\Delta\theta>\theta a+\theta\alpha$ or not. When not $\Delta\theta>\theta a+\theta\alpha$, the control device 9 in step S22 determines whether the difference in amount of rotation $\Delta\theta$ is $\Delta\theta<\theta a-\theta\alpha$ or not. On the other hand, when $\Delta\theta>\theta a+\theta\alpha$, the control device 9 in step S23 drives the ultrasonic motor 4 to rotate the first rotor 31 in the releasing direction and reduce the gripping force on the workpiece W. When the difference in amount of rotation $\Delta\theta$ is $\Delta\theta<\theta a-\theta\alpha$ in step S22, the control device 9 in step S24 drives the ultrasonic motor 4 to rotate the first rotor 31 in the pinching direction and increase the gripping force on the workpiece W. When the difference in amount of rotation $\Delta\theta$ is not $\Delta\theta<\theta a-\theta\alpha$, or after the foregoing steps S23, S24 are finished, the control device 9 in step S25 determines whether a release command, which is a command to start the releasing operation S3, is accepted or not. When a release command is not accepted, the control device 9 returns to step S21. When a release command is accepted, the control device 9 ends the holding operation S2 and shifts to the releasing operation S3.

The holding operation S2 has been described. By such a method, the workpiece W can continue to be gripped stably with the target gripping force until reaching the target position after the pinching operation S1 ends. Therefore, unintentional detachment of the workpiece W or unintentional shift in position of the workpiece W while moving to the target position can be effectively restrained. The holding operation S2 is not limited to this example. For example, the order of steps S21 and S23 may be reversed.

The releasing operation S3 will now be described. When the workpiece W pinched by the first and second finger parts 81, 82 in the pinching operation S1 is to be released, the workpiece W may be caught on or adhere to the first and second finger parts 81, 82 and may not be easily detached in some cases. To cope with this, the hand 1 has a function of causing the first and second finger parts 81, 82 to vibrate and thus forcing the workpiece W adhering to the first and second finger parts 81, 82 to be detached, in the releasing operation S3.

In the description below, for the sake of convenience of the description, the control for causing the first and second finger parts 81, 82 to vibrate and thus forcing the workpiece W adhering to the first and second finger parts 81, 82 to be detached is also referred to as "vibration control". The amplitude of the first and second finger parts 81, 82 in the vibration control (when steps S36, S37, described later, are repeated) is defined as Y. The amplitude Y is found in advance, based on an experiment, a simulation or the like, and is stored in the storage unit 92 of the control device 9. To describe the amplitude Y more in detail, Y=Y1+Y2, where Y1 is the amplitude of the first finger part 81 in the vibration control and Y2 is the amplitude of the second finger part 82 in the vibration control. In the vibration control, only one of the first and second finger parts 81, 82 may be made to vibrate. Therefore, for example, when only the first finger part 81 is made to vibrate, Y=Y1. When only the second finger part 82 is made to vibrate, Y=Y2. The vibration control is configured to force vibration to achieve the stored amplitude Y and is therefore different, for example, from the vibration of the first and second finger parts 81, 82 due to the transmission of external vibration.

As shown in FIG. 9, in such a releasing operation S3, first, the control device 9 in step S31 determines whether the vibration control is needed or not. Whether the vibration control is needed or not, may be decided by the user in advance, for example, based on the type of the workpiece W, that is, the shape, weight, material or the like of the workpiece W. Also, a table that associates the type of the workpiece W with whether the vibration control is needed or not, may be prepared, and the control device 9 may determine whether the vibration control is needed or not, referring to this table.

When performing the vibration control, the control device 9 in step S32 reads the amplitude Y from the storage unit 92 and decides a target relative position Zm. The target relative position Zm is set to the reference relative position Za+the amplitude Y or more (Zm≥Za+Y), that is, a relative position where the first and second finger parts 81, 82 are spaced further apart from each other than at the reference relative position Za by the amplitude Y or more. Particularly in this embodiment, Zm=Za+Y. Next, in step S33, the control device 9 drives the ultrasonic motor 4 to rotate the first rotor 31 in the releasing direction. The first and second finger parts 81, 82 move in an opening direction. Next, in step S34, the control device 9 determines whether the relative position Z of the first and second finger parts 81, 82 has reached the target relative position Zm or not. That is, the control device 9 determines whether Z≥Zm or not.

When not Z≥Zm, that is, when Z<Zm, the control device 9 returns to step S33 and repeats step S33 until Z≥Zm. On the other hand, when Z≥Zm, the control device 9 in step S35 stops driving the ultrasonic motor 4 and ends the movement of the first and second finger parts 81, 82. Next, in step S36, the control device 9 drives the ultrasonic motor 4 to rotate the first rotor 31 in the pinching direction in such a way that the relative position Z of the first and second finger parts 81, 82 achieves Za≤Z<Zm. Particularly in this embodiment, the control device 9 rotates the first rotor 31 in the pinching direction until the relative position Z becomes Za. Next, in step S37, the control device 9 drives the ultrasonic motor 4 to rotate the first rotor 31 in the releasing direction in such a way that the relative position Z of the first and second finger parts 81, 82 achieves Z≥Zm. Particularly in this embodiment, the control device 9 rotates the first rotor 31 in the releasing direction until the relative position Z becomes Zm.

Next, in step S38, the control device 9 determines whether a number of times of execution i of steps S36, S37 has becomes equal to or greater than a target number of times of execution ia, or not. When i<ia, the control device 9 repeats steps S36, S37 until the number of times of execution i of steps S36, S37 becomes equal to or greater than target number of times of execution ia. On the other hand, when i≥ia, the control device 9 in step S39 drives the ultrasonic motor 4 to rotate the first rotor 31 in the releasing direction. Thus, the first and second finger parts 81, 82 move in the opening direction and become sufficiently open in relation to the workpiece W. Also, when determining in step S31 that the vibration control is not needed, the control device 9 executes step S39.

The releasing operation has been described. In such a method, steps S36, S37 are repeated at a high speed the target number of times of execution ia or more, thus causing the first and second finger parts 81, 82 to vibrate with the amplitude Y. Generating the vibration can force the workpiece W adhering to the first and second finger parts 81, 82 to be detached. Therefore, the workpiece W can be released more securely. Particularly, in the hand 1, the vibration of the first and second finger parts 81, 82 is the repetition of the reference relative position Za and the target relative position Zm, and even the state where the first and second finger parts 81, 82 are the nearest to each other is equal to the reference relative position Za. The distance between the first and second finger parts 81, 82 at the reference relative position Za is substantially equal to the width of the workpiece W. Therefore, such vibration is unlikely to apply an excessive stress to the workpiece W. Thus, breakage of or damage to the workpiece W due to vibration can be effectively restrained. Also, repeating the movement to the reference relative position Za and the movement to the target relative position Zm as in this embodiment enables easy control for causing the first and second finger parts 81, 82 to vibrate.

The configuration of the hand 1 and the method for driving the hand 1 have been described. As described above, such a hand 1 has: the first finger part 81 and the second finger part 82 pinching the workpiece W, which is a target object; the ultrasonic motor 4, which is a drive unit driving at least one of the first finger part 81 and the second finger part 82 and thus controlling the relative position Z of the first finger part 81 and the second finger part 82; the position detection unit 91 detecting the relative position Z of the first finger part 81 and the second finger part 82; the storage unit 92 storing the relative position Z detected by the position detection unit 91; and the drive control unit 93 controlling the driving of the ultrasonic motor 4. The position detection unit 91 detects the relative position Z of the first finger part 81 and the second finger part 82 as of when the first finger part 81 and the second finger part 82 pinch the workpiece W therebetween, as the reference relative position Za. The storage unit 92 stores reference relative position Za. The drive control unit 93 moves the relative position Z of the first finger part 81 and the second finger part 82 to the target relative position Zm, where the first finger part 81 and the second finger part 82 are spaced further apart from each other than at the reference relative position Za, by the ultrasonic motor 4, on accepting an instruction to release the workpiece W pinched by the first finger part 81 and the second finger part 82. The drive control unit 93 causes at least one of the first finger part 81 and the second finger part 82 to vibrate by the ultrasonic motor 4, when the target relative position Zm is achieved. At the target relative position Zm, the first finger part 81 and the second finger part 82 are spaced further apart from each other than at the reference relative position Za by the amplitude Y of the vibration thereof or more. In such a configuration, an excessive stress is unlikely to be applied to the workpiece W even when the first and second finger parts 81, 82 vibrate. Therefore, breakage of or damage to the workpiece W due to vibration can be effectively restrained.

Also, as described above, the reference relative position Za is the position as of when the reaction force N from the workpiece W is applied to the first finger part 81 and the second finger part 82. Thus, the reference relative position Za can be set more properly.

As described above, the vibration is the repetition of the movement to the reference relative position Za and the movement to the target relative position Zm. This enables easy control for causing the first and second finger parts 81, 82 to vibrate.

Also, as described above, in the method for driving the hand 1, the hand 1 has: the first finger part 81 and the second finger part 82; the ultrasonic motor 4, which is a drive unit driving at least one of the first finger part 81 and the second finger part 82 and thus controlling the relative position Z of the first finger part 81 and the second finger part 82; and the position detection unit 91 detecting the relative position Z of the first finger part 81 and the second finger part 82. The hand 1 pinches the workpiece W, which is a target object, between the first finger part 81 and the second finger part 82. The method includes: step S13 of detecting the relative position Z of the first finger part 81 and the second finger part 82 as of when the first finger part 81 and the second finger part 82 pinch the workpiece W therebetween, as the reference relative position Za, by the position detection unit 91; step S34 of moving the relative position Z of the first finger part 81 and the second finger part 82 to the target relative position Zm, where the first finger part 81 and the second finger part 82 are spaced further apart from each other than at the reference relative position Za, by the ultrasonic motor 4, on accepting an instruction to release the workpiece W pinched by the first finger part 81 and the second finger part 82; and steps S36, S37 of causing at least one of the first finger part 81 and the second finger part 82 to vibrate by the ultrasonic motor 4, when the target relative position Zm is achieved. At the target relative position Zm, the first finger part 81 and the second finger part 82 are spaced further apart from each other than at the reference relative position Za by the amplitude Y of the vibration thereof or more. In such a driving method, an excessive stress is unlikely to be applied to the workpiece W even when the first and second finger parts 81, 82 vibrate. Therefore, breakage of or damage to the workpiece W due to vibration can be effectively restrained.

As described above, step S32 of deciding the target relative position Zm, based on the amplitude Y, is performed prior to steps S36, S37 of vibration. Thus, steps S36, S37 of vibration can be performed smoothly.

Second Embodiment

Figure 10:
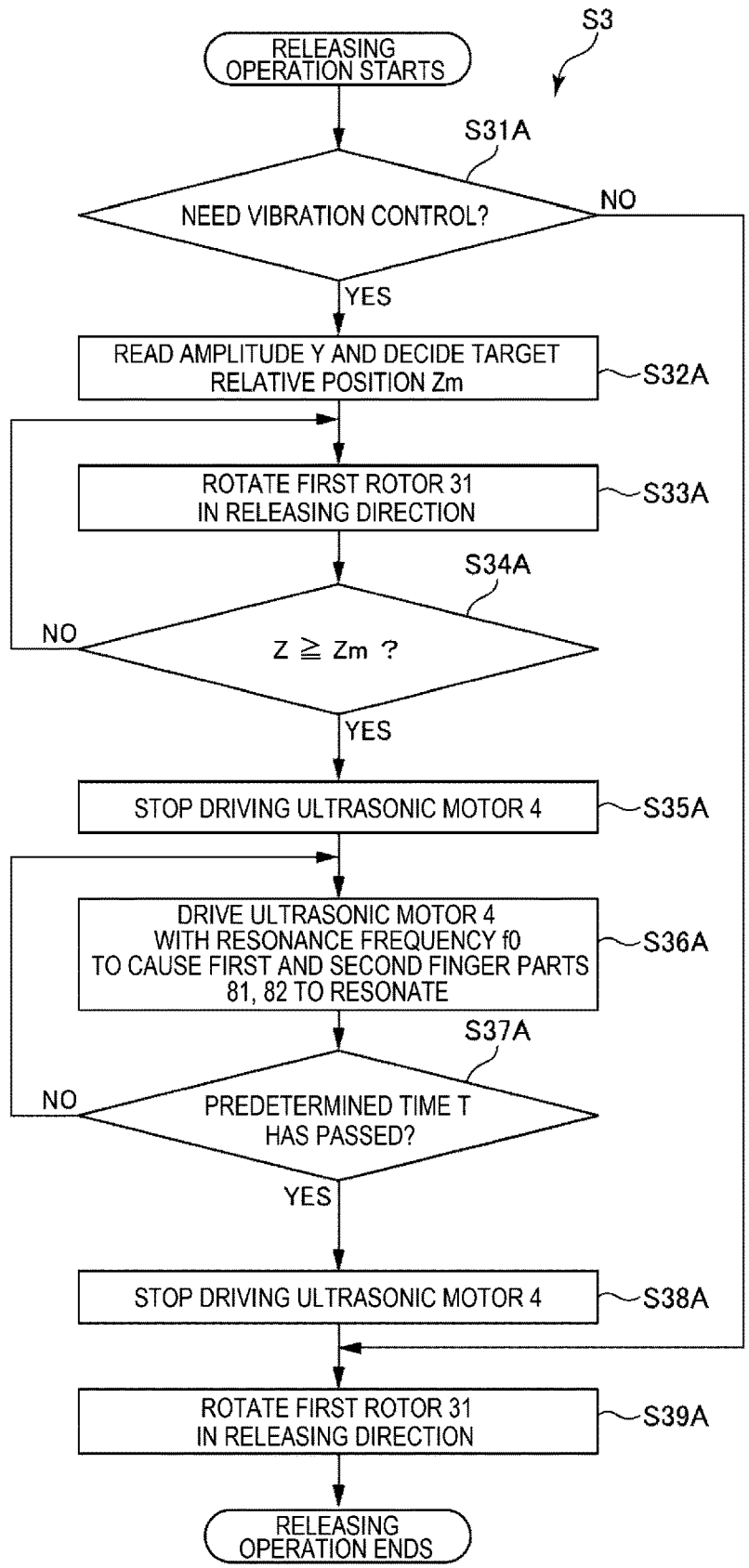
FIG. 10 is a flowchart showing procedures of a releasing operation of a hand according to a second embodiment.

FIG. 10 is a flowchart showing procedures of a releasing operation of a hand according to a second embodiment.

The hand 1 according to this embodiment is similar to the hand 1 according to the first embodiment except that the method of generating vibration in the releasing operation S3 is different. In the description below, this embodiment is described mainly in terms of the difference from the foregoing embodiment and similar matters are not described further. In FIG. 10, components similar to those in the foregoing embodiment are denoted by the same reference signs.

In the releasing operation S3 in this embodiment, the ultrasonic motor 4 is driven with a resonance frequency f0 of the first finger part 81 or the second finger part 82, thus causing the first finger part 81 or the second finger part 82 to vibrate. In this embodiment, the configurations of the first and second finger parts 81, 82 are similar to each other. Therefore, it is assumed that the resonance frequencies f0 of the first and second finger parts 81, 82 have equal to each other. The resonance frequency f0 of the first and second finger parts 81, 82 is found in advance, based on an experiment, a simulation or the like, and is stored in the storage unit 92.

As shown in FIG. 10, in the releasing operation S3 in this embodiment, first, the control device 9 in step S31A determines whether the vibration control is needed or not. When performing the vibration control, the control device 9 in step S32A reads the amplitude Y from the storage unit 92 and decides the target relative position Zm, based on the amplitude Y and the reference relative position Za. The amplitude Y in this embodiment is the amplitude of resonance of the first and second finger parts 81, 82 in step S36A, described later. Next, in step S33A, the control device 9 drives the ultrasonic motor 4 to rotate the first rotor 31 in the releasing direction. Thus, the first and second finger parts 81, 82 move in the opening direction. Next, in step S34A, the control device 9 determines whether the relative position Z of the first and second finger parts 81, 82 has reached the target relative position Zm or not. That is, the control device 9 determines whether Z≥Zm or not.

When not Z≥Zm, the control device 9 returns to step S33A and repeats step S33A until Z≥Zm. On the other hand, when Z≥Zm, the control device 9 in step S35A stops driving the ultrasonic motor 4. The processing up to this point is similar to the processing in the first embodiment.

Next, in step S36A, the control device 9 drives the ultrasonic motor 4 with the resonance frequency f0 of the first and second finger parts 81, 82. Specifically, a drive voltage set to a frequency equal to the resonance frequency f0 is applied in the same phase to the piezoelectric elements 4A to 4F and thus causes the vibrating part 41 to longitudinally vibrate in the longitudinal direction with the resonance frequency f0. This vibration is transmitted to the first and second finger parts 81, 82, thus causing the first and second finger parts 81, 82 to resonate.

Next, in step S37A, the control device 9 determines whether or not a predetermined time T (seconds) has passed as the driving time of the ultrasonic motor 4 with the resonance frequency f0. When the predetermined time T has not passed, the control device 9 returns to step S36A. On the other hand, when the predetermined time T has passed, the control device 9 in step S38A stops driving the ultrasonic motor 4. Next, in step S39A, the control device 9 drives the ultrasonic motor 4 to rotate the first rotor 31 in the releasing direction. Thus, the first and second finger parts 81, 82 move in the opening direction and become sufficiently open in relation to the workpiece W. Also, when determining in step S31A that the vibration control is not needed, the control device 9 executes step S39A.

The releasing operation S3 has been described. In such a method, step S36A causes the first and second finger parts 81, 82 to resonate. Thus, the workpiece W adhering to the first and second finger parts 81, 82 can be forced to be detached. Therefore, the workpiece W can be released more securely. Particularly, since the hand 1 utilizes the resonance of the first and second finger parts 81, 82, the first and second finger parts 81, 82 can be made to vibrate more securely and with a higher amplitude Y. Thus, the workpiece W adhering to the finger parts can be detached more securely. Also, by utilizing the resonance, the first and second finger parts 81, 82 can be easily made to vibrate.

As described above, the hand 1 according to this embodiment has the ultrasonic motor 4 as a drive unit. The ultrasonic motor 4 is driven with the resonance frequency f0 of the first finger part 81 or the second finger part 82, thus generating vibration. This enables the utilization of the resonance of the first and second finger parts 81, 82 and enables the first and second finger parts 81, 82 to vibrate more securely and with a higher amplitude Y. Therefore, the workpiece W adhering to the finger parts can be detached more securely.

Such a second embodiment can achieve effects similar to those of the foregoing first embodiment.

Third Embodiment

Figure 11:
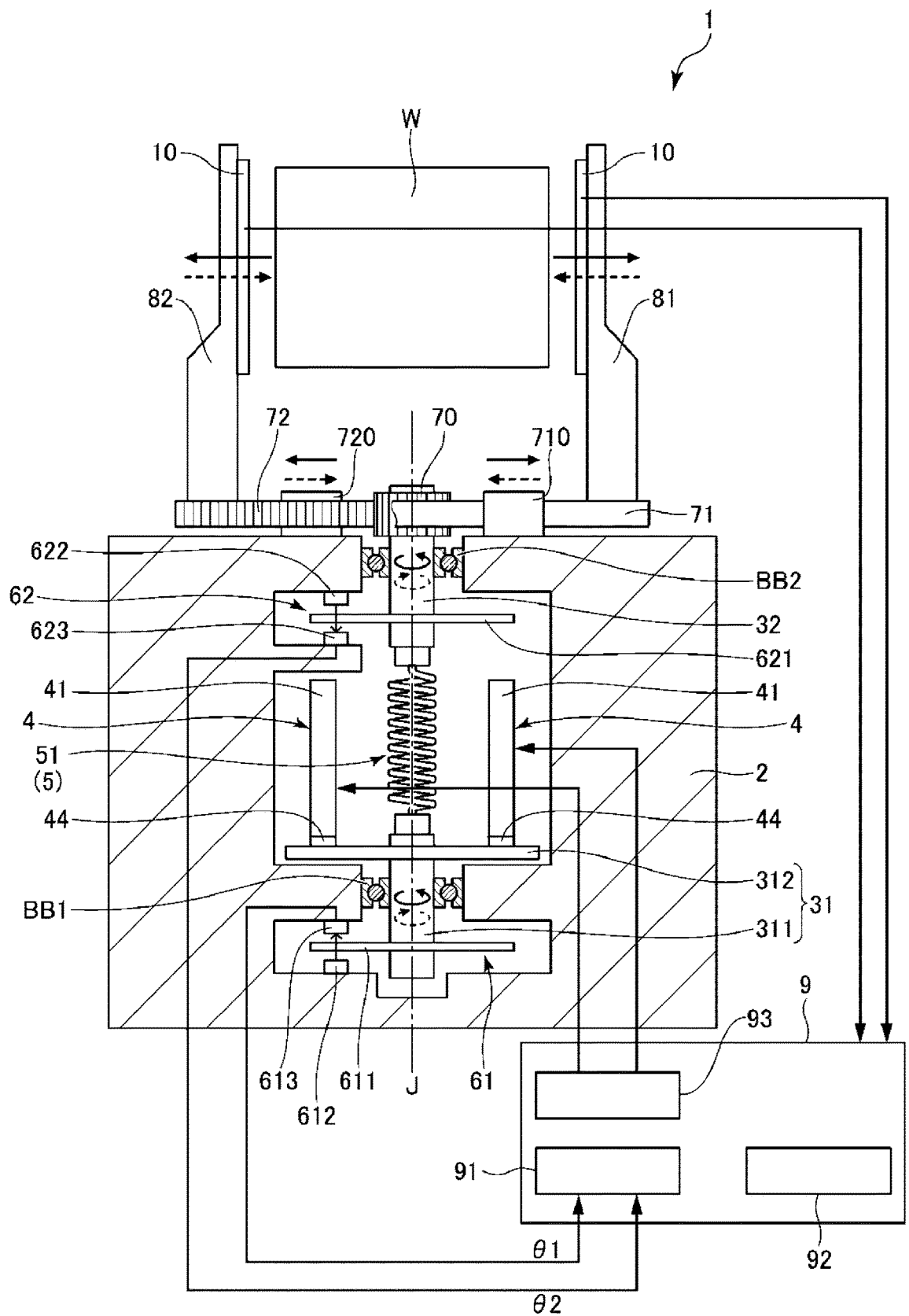
FIG. 11 is a cross-sectional view showing a hand according to a third embodiment.
Figure 12:
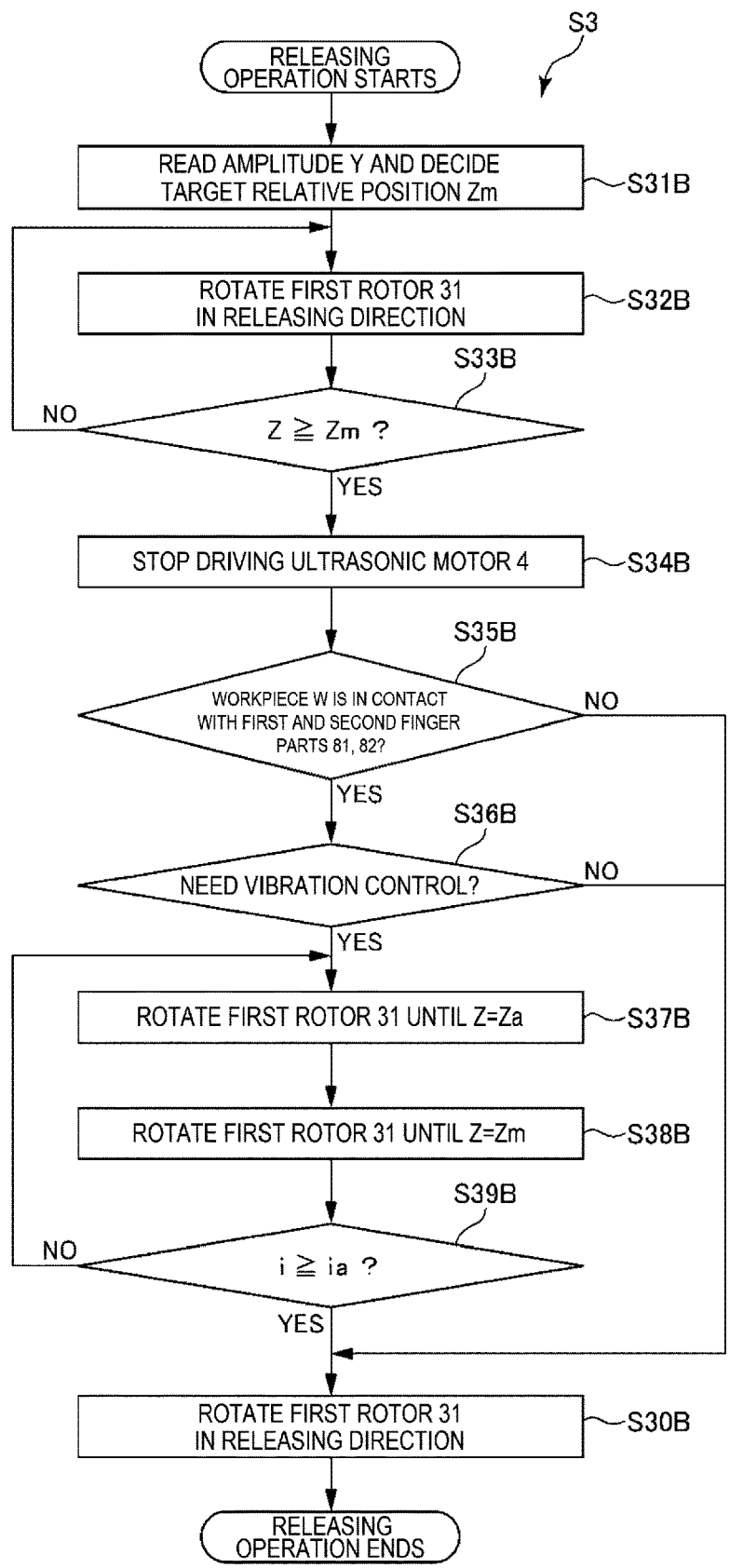
FIG. 12 is a flowchart showing procedures of a releasing operation of the hand shown in FIG. 11.

FIG. 11 is a cross-sectional view showing a hand according to a third embodiment. FIG. 12 is a flowchart showing procedures of a releasing operation of the hand shown in FIG. 11.

The hand 1 according to this embodiment is similar to the hand 1 according to the first embodiment except that the timing of determining whether the vibration control is needed or not, in the releasing operation S3, is different. In the description below, this embodiment is described mainly in terms of the difference from the foregoing embodiment and similar matters are not described further. In FIGS. 11 and 12, components similar to those in the foregoing embodiment are denoted by the same reference signs.

As shown in FIG. 11, the hand 1 according to this embodiment has a force sensor 10 that is arranged at a contact surface of the first and second finger parts 81, 82 coming into contact with the workpiece W and that detects the contact between the first and second finger parts 81, 82 and the workpiece W. The measure for detecting the contact is not limited to the force sensor 10. Any other measures that can detect the contact between the first and second finger parts 81, 82 and the workpiece W, for example, a load cell using a strain gauge, may be used. Also, a camera may be used to detect the contact between the first and second finger parts 81, 82 and the workpiece W.

A method for driving the hand 1 will now be described. The driving method in this embodiment is different from the driving method in the first embodiment only in the releasing operation S3. Therefore, only the releasing operation S3 will be described below. The releasing operation S3 in this embodiment is different from the releasing operation S3 in the first embodiment in that whether the vibration control is needed or not is determined after an attempt to release the workpiece W is made by moving the first and second finger parts 81, 82 in the opening direction.

As shown in FIG. 12, in the releasing operation S3 in this embodiment, first, the control device 9 in step S31B reads the amplitude Y from the storage unit 92 and decides the target relative position Zm, based on the amplitude Y and the reference relative position Za. Next, in step S32B, the control device 9 drives the ultrasonic motor 4 to rotate the first rotor 31 in the releasing direction. Thus, the first and second finger parts 81, 82 move in the opening direction, attempting to release the workpiece W. Next, in step S33B, the control device 9 determines whether the relative position Z of the first and second finger parts 81, 82 has reached the target relative position Zm or not. That is, the control device 9 determines whether $Z \geq Zm$ or not. When not $Z \geq Zm$, that is, when $Z < Zm$, the control device 9 returns to step S32B and repeats step S32B until $Z \geq Zm$.

On the other hand, when $Z \geq Zm$, the control device 9 in step S34B stops driving the ultrasonic motor 4. Next, in step S35B, the control device 9 determines whether the workpiece W is in contact with the force sensor 10 or not, that is, whether the workpiece W is adhering to the first and second finger parts 81, 82 or not, based on a signal from the force sensor 10. When the workpiece W is adhering to the first and second finger parts 81, 82, the control device 9 in step S36B determines whether the vibration control is needed or not. Since the workpiece W adhering to the finger parts needs to be detached, the control device 9 normally determines that the vibration control is needed. However, for example, in some unique or particular circumstances, the control device 9 can determine that the vibration control is not needed. Also, without having to make such a determination, the vibration control may be performed without exception when it is determined in step S35B that the workpiece W is adhering to the first and second finger parts 81, 82.

Next, in step S37B, the control device 9 drives the ultrasonic motor 4 to rotate the first rotor 31 in the pinching direction in such a way that the relative position Z of the first and second finger parts 81, 82 achieves $Za \leq Z < Zm$. Particularly in this embodiment, the control device 9 rotates the first rotor 31 in the pinching direction until the relative position Z becomes Za. Next, in step S38B, the control device 9 drives the ultrasonic motor 4 to rotate the first rotor 31 in the releasing direction in such a way that the relative position Z of the first and second finger parts 81, 82 achieves $Z \geq Zm$. Particularly in this embodiment, the control device 9 rotates the first rotor 31 in the releasing direction until the relative position Z becomes Zm.

Next, in step S39B, the control device 9 determines whether the number of times of execution i of steps S37B, S38B has becomes equal to or greater than the target number of times of execution ia, or not. When $i < ia$, the control device 9 returns to step S37B and repeats steps S37B, S38B until the number of times of execution i of steps S37B, S38B becomes equal to or greater than target number of times of execution ia. On the other hand, when $i \geq ia$, the control device 9 in step S30B drives the ultrasonic motor 4 to rotate the first rotor 31 in the releasing direction. Thus, the first and second finger parts 81, 82 move in the opening direction and become sufficiently open in relation to the workpiece W. Also, when determining in step S35B that the workpiece W is not adhering to the first and second finger parts 81, 82 or when determining in step S36B that the vibration control is not needed, the control device 9 executes step S30B.

The releasing operation S3 has been described. In such a method, the vibration control is performed only when the workpiece W is adhering to the first and second finger parts 81, 82 as a result of attempting to release the workpiece W. Therefore, the execution of unnecessary drive control is restrained and the cycle time of the hand 1 is shorter accordingly.

Such a third embodiment can achieve effects similar to those of the first embodiment.

Fourth Embodiment

Figure 13:
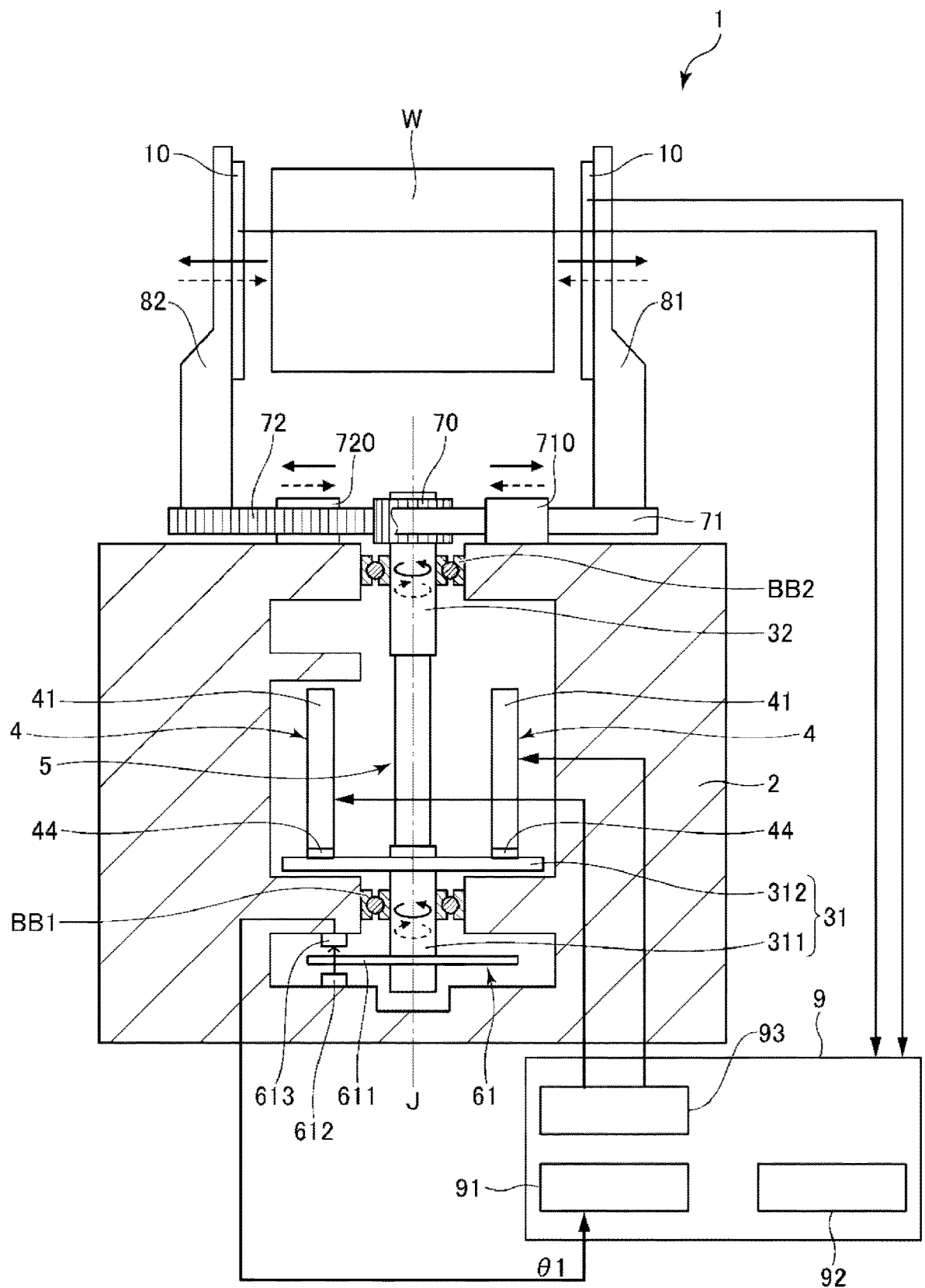
FIG. 13 is a cross-sectional view showing a hand according to a fourth embodiment.
Figure 14:
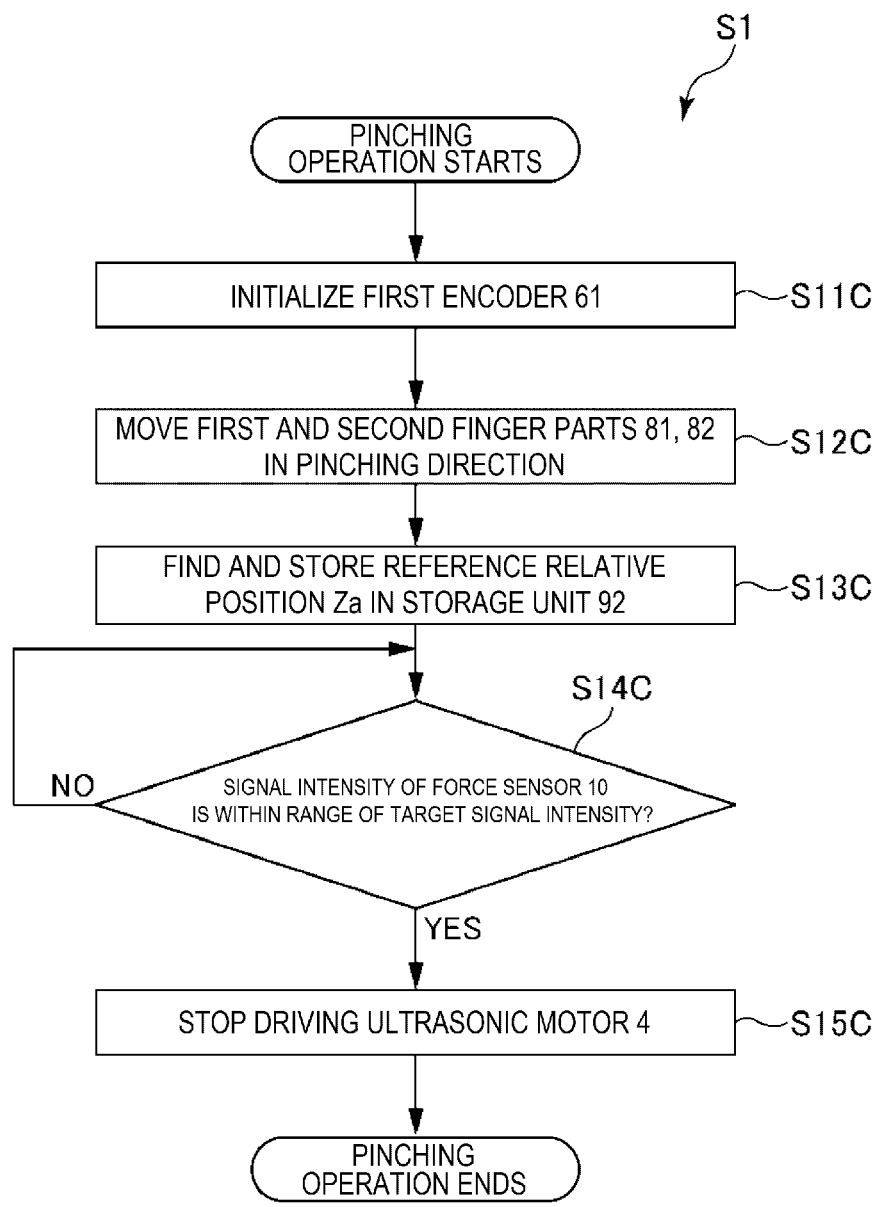
FIG. 14 is a flowchart showing procedures of a pinching operation of the hand shown in FIG. 13.
Figure 15:
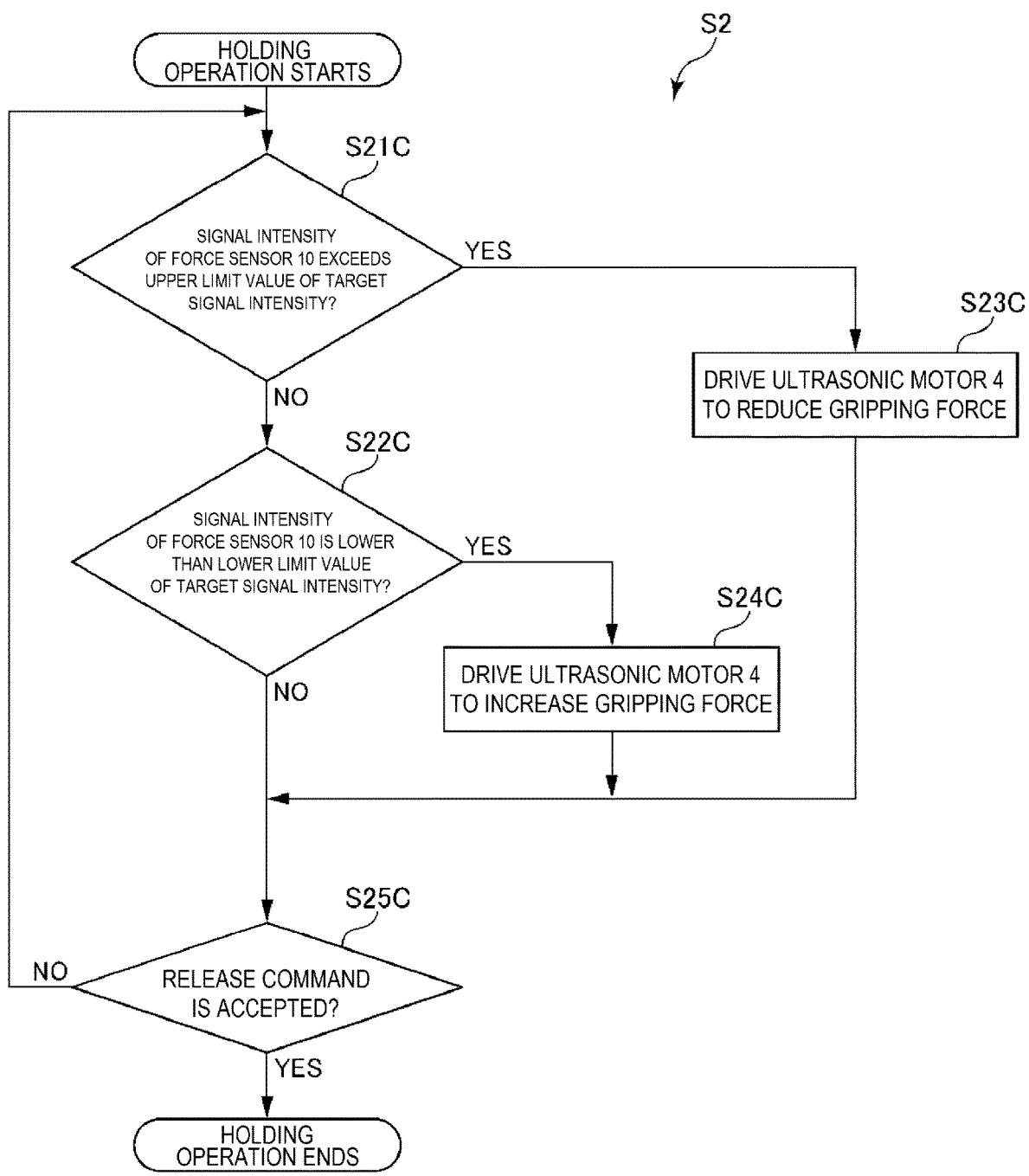
FIG. 15 is a flowchart showing procedures of a holding operation of the hand shown in FIG. 13.

FIG. 13 is a cross-sectional view showing a hand according to a fourth embodiment. FIG. 14 is a flowchart showing procedures of a pinching operation of the hand shown in FIG. 13. FIG. 15 is a flowchart showing procedures of a holding operation of the hand shown in FIG. 13.

The hand 1 according to this embodiment is similar to the hand 1 according to the foregoing third embodiment except that the configuration of the transmission unit 5 is different and that the second encoder 62 is omitted. In the description below, this embodiment is described mainly in terms of the difference from the foregoing embodiment and similar matters are not described further. In FIGS. 13 to 15, components similar to those in the foregoing embodiment are denoted by the same reference signs.

In the hand 1 shown in FIG. 13, the transmission unit 5 is rigid and not elastic. That is, the transmission unit 5 is not substantially deformed by a force equivalent to the reaction force N from the workpiece W. Therefore, it can be said that the first rotor 31 and the second rotor 32 are directly coupled together by the transmission unit 5. It can also be said that the first rotor 31, the transmission unit 5, and the second rotor 32 are collectively defined as the first rotor 31 and that the pinion 70 is coupled to the upper end part of the first rotor 31. Since the first rotor 31 and the second rotor 32 are thus directly coupled together, one of the first and second encoders 61, 62 is unnecessary. Therefore, in this embodiment, the second encoder 62 is omitted.

The configuration of the hand 1 has been described. A method for driving the hand 1 will now be described in detail, referring to FIGS. 14 and 15. The method for driving the hand 1 includes the pinching operation S1 for pinching the workpiece W, the holding operation S2 for maintaining the state of pinching the workpiece W, and the releasing operation S3 for releasing the pinched workpiece W. Of these, the releasing operation S3 is similar to the releasing operation S3 in the first embodiment. Therefore, only the pinching operation S1 and the holding operation S2 will be described below.

First, the pinching operation S1 will be described. As shown in FIG. 14, first, in step S11C, the control device 9 initializes position information of the first encoder 61. Next, in step S12C, the control device 9 drives the ultrasonic motor 4 in the state where the workpiece W is located between the first finger part 81 and the second finger part 82, and thus causes the first finger part 81 and the second finger part 82 to move in the pinching direction. As the driving of the ultrasonic motor 4 is continued and the first and second finger parts 81, 82 come into contact with the workpiece W, a signal corresponding to this contact is outputted from the force sensor 10. Therefore, in step S13C, the control device 9 finds the relative position Z of the first and second finger parts 81, 82 as of when the first and second finger parts 81, 82 come into contact with the workpiece W, based on the output from the force sensor 10 and the amount of rotation θ1, and stores this relative position Z as the reference relative position Za.

In the control device 9, a signal intensity of the force sensor 10 generated when a target gripping force suitable for pinching the workpiece W is achieved, is stored as a target signal intensity. Thus, the control device 9 continues driving the ultrasonic motor 4 in such a way that the signal intensity of the force sensor 10 falls within the range of the target signal intensity. In step S14C, the control device 9 compares the signal intensity of the force sensor 10 with the target signal intensity and determines whether the signal intensity of the force sensor 10 is within the range of the target signal intensity or not. When the signal intensity of the force sensor 10 is not within the range of the target signal intensity, the control device 9 continues driving the ultrasonic motor 4 until the signal intensity of the force sensor 10 is within the range of the target signal intensity. On the other hand, when the signal intensity of the force sensor 10 is within the range of the target signal intensity, the control device 9 in step S15C stops driving the ultrasonic motor 4 and maintains the gripping force at the time. Thus, the workpiece W can be gripped with the target gripping force.

The holding operation S2 will now be described. As shown in FIG. 15, first, in step S21C, the control device 9 determines whether the signal intensity of the force sensor 10 exceeds an upper limit value of the target signal intensity or not. When the signal intensity of the force sensor 10 does not exceed the upper limit value of the target signal intensity, the control device 9 in step S22C determines whether the signal intensity of the force sensor 10 is lower than a lower limit value of the target signal intensity or not. On the other hand, when the signal intensity of the force sensor 10 exceeds the upper limit value of the target signal intensity, the control device 9 in step S23C drives the ultrasonic motor 4 to cause the first rotor 31 to rotate in the releasing direction, thus reducing the gripping force on the workpiece W.

When the signal intensity of the force sensor 10 is lower than the lower limit value of the target signal intensity in step S22C, the control device 9 in step S24C drives the ultrasonic motor 4 to cause the first rotor 31 to rotate in the pinching direction, thus increasing the gripping force on the workpiece W. On the other hand, when the signal intensity of the force sensor 10 is not lower than the lower limit value of the target signal intensity or when the foregoing steps S23C, S24C are finished, the control device 9 in step S25C determines whether a release command, which is a command to start the releasing operation S3, is accepted or not. When a release command is not accepted, the control device 9 returns to step S21C. When a release command is accepted, the control device 9 ends the holding operation S2 and shifts to the releasing operation S3.

Such a fourth embodiment can achieve effects similar to those of the foregoing first embodiment.

The method for driving the hand and the hand according to the present disclosure have been described, based on the illustrated preferred embodiments. However, the present disclosure is not limited to these embodiments. The configuration of each part can be replaced with any configuration having similar functions. Also, any other components may be added. The foregoing embodiments may be suitably combined together.

What is claimed is:

1. A method for driving a hand, the hand comprising a first finger part and a second finger part, a drive unit driving at least one of the first finger part and the second finger part and thus controlling a relative position of the first finger part and the second finger part, and a position detection unit detecting the relative position of the first finger part and the second finger part, the hand pinching a target object between the first finger part and the second finger part, the method comprising:

detecting the relative position of the first finger part and the second finger part as of when the first finger part and the second finger part pinch the target object therebetween, as a reference relative position, by the position detection unit;

moving the relative position of the first finger part and the second finger part to a target relative position where the first finger part and the second finger part are spaced further apart from each other than at the reference relative position by an amplitude of vibration or more, by the drive unit, on accepting an instruction to release the target object pinched by the first finger part and the second finger part; and causing at least one of the first finger part and the second finger part to vibrate by the drive unit, when the target relative position is achieved.

2. The method for driving the hand according to claim 1, further comprising:

deciding the target relative position, based on the amplitude, prior to the causing at least one of the first finger part and the second finger part to vibrate.

3. A hand comprising:

a first finger part and a second finger part pinching a target object therebetween;

a drive unit driving at least one of the first finger part and the second finger part and thus controlling a relative position of the first finger part and the second finger part;

a position detection unit detecting the relative position of the first finger part and the second finger part;

a storage unit storing the relative position detected by the position detection unit; and a drive control unit controlling driving of the drive unit, wherein the position detection unit detects the relative position of the first finger part and the second finger part as of when the first finger part and the second finger part pinch the target object therebetween, as a reference relative position, the storage unit stores the reference relative position, and the drive control unit moves the relative position of the first finger part and the second finger part to a target relative position where the first finger part and the second finger part are spaced further apart from each other than at the reference relative position by an amplitude of vibration or more, by the drive unit, on accepting an instruction to release the target object pinched by the first finger part and the second finger part, and the drive control unit causes at least one of the first finger part and the second finger part to vibrate by the drive unit, when the target relative position is achieved.

4. The hand according to claim 3, wherein the reference relative position is a position as of when a reaction force from the target object is applied to the first finger part and the second finger part.

5. The hand according to claim 3, wherein the vibration is repetition of a movement to the reference relative position and a movement to the target relative position.

6. The hand according to claim 3, wherein the drive unit has an ultrasonic motor, and the ultrasonic motor is driven with a resonance frequency of the first finger part or the second finger part, thus generating the vibration.

\* \* \* \* \*